United States Patent
Wells et al.

(10) Patent No.: US 9,118,673 B2
(45) Date of Patent: *Aug. 25, 2015

(54) METHODS AND SYSTEMS FOR SECURE KEY ENTRY VIA COMMUNICATION NETWORKS

(71) Applicant: Next Access Technologies, LLC, Stamford, CT (US)

(72) Inventors: David L. Wells, Guilford, CT (US); Jack Loop, New Canaan, CT (US); Charles Bakes, West Palm Beach, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/960,282

(22) Filed: Aug. 6, 2013

(65) Prior Publication Data

US 2013/0347066 A1 Dec. 26, 2013

Related U.S. Application Data

(63) Continuation of application No. 12/507,363, filed on Jul. 22, 2009, now Pat. No. 8,528,045.

(60) Provisional application No. 61/082,553, filed on Jul. 22, 2008.

(51) Int. Cl.
| | |
|---|---|
| H04L 7/04 | (2006.01) |
| H04L 29/06 | (2006.01) |
| H04W 12/06 | (2009.01) |
| H04L 9/32 | (2006.01) |

(52) U.S. Cl.
CPC .......... *H04L 63/0884* (2013.01); *H04L 9/3226* (2013.01); *H04L 63/0838* (2013.01); *H04W 12/06* (2013.01); *H04L 2209/56* (2013.01); *H04L 2209/805* (2013.01)

(58) Field of Classification Search
CPC ..... H04L 63/08; H04L 63/0884; H04L 29/06; H04L 29/08; H04L 9/0833
USPC ....................... 726/2; 713/182, 170
See application file for complete search history.

(56) References Cited

U.S. PATENT DOCUMENTS

| | | | | |
|---|---|---|---|---|
| 5,428,349 | A * | 6/1995 | Baker | 340/5.54 |
| 7,239,329 | B2 * | 7/2007 | Bixler et al. | 345/629 |
| 7,614,077 | B2 * | 11/2009 | Brew et al. | 726/1 |
| 7,765,580 | B2 * | 7/2010 | Vandergeest et al. | 726/2 |
| 2004/0230843 | A1 * | 11/2004 | Jansen | 713/202 |
| 2005/0289459 | A1 * | 12/2005 | Walton | 715/526 |
| 2007/0277224 | A1 * | 11/2007 | Osborn et al. | 726/2 |
| 2010/0024022 | A1 | 1/2010 | Wells et al. | |

* cited by examiner

*Primary Examiner* — Ali Abyaneh
(74) *Attorney, Agent, or Firm* — Buckley, Maschoff & Talwalkar LLC

(57) ABSTRACT

According to some embodiments, a member authentication request is received at a security server from a client server. The member authentication request may be associated with, for example, a member attempting to access confidential information from the client server. A secure key associated with the member may be determined and data associated with that key may be transmitted to the member (e.g., via his or her wireless device or computer). Secure key information may be received from the member and validated. Based on the validated secure key information, it may be arranged for the member to receive the confidential information from the client server.

20 Claims, 23 Drawing Sheets

METHODS AND SYSTEMS FOR SECURE KEY ENTRY VIA COMMUNICATION NETWORKS

CROSS-REFERENCE TO RELATED APPLICATIONS

The present application is a continuation of U.S. patent application Ser. No. 12/507,363 entitled "METHODS AND SYSTEMS FOR SECURE KEY ENTRY VIA COMMUNICATION NETWORKS" and filed Jul. 22, 2009 which claimed priority under 35 U.S.C. §119(e) to U.S. Provisional Patent Application No. 61/082,553 entitled "METHODS AND SYSTEMS FOR SECURE KEY ENTRY VIA COMMUNICATION NETWORKS," filed on Jul. 22, 2008. The entire contents of those applications are incorporated herein by reference.

BACKGROUND

In some cases, it is necessary to authenticate an entity via a communication network or computing device. For example, a bank might want to ensure that only an appropriate account owner will be able to access confidential information about a financial account or a mobile phone user wants to access information stored on their device or via the Internet. To provide such authentication, an entity is often asked to remember and provide an alphanumeric "key" through a communication network. For example, a person might be asked for his or her user name and password or Personal Identification Number (PIN) before being allowed to receive (and/or transmit) sensitive information on a web site via the Internet.

Such an approach, however, can have a number of disadvantages. For example, if an unauthorized party is able to view the password as it is entered by the entity, that party will later be able to impersonate the entity (e.g., by providing the same password). Similarly, an unauthorized party might install a "key logging" program on a computer that secretly records a password when it is entered. This risk may be especially significant when an entity is using a shared or public computer or network.

To avoid such results, an entity might be asked to use a specific physical item (e.g., a keychain fob or smart card able to transmit an identifier to a receiving device) to provide authentication. Once again, an unauthorized person might be able to intercept the identifier and later impersonate the entity. By way of example, a signal from a Radio Frequency Identification (RFID) chip or an electronically readable magnetic strip card might be intercepted. In addition, an entity might lose the item and be unable to provide authentication. Other approaches involve determining biometric information (e.g., by reading a person's fingerprint). Note that whenever special hardware is needed to implement an authentication technique, the cost required may be prohibitive.

SUMMARY OF THE INVENTION

According to some embodiments, a member authentication or unlock request may be received at a security server from a client server or directly from a native application stored on a computing device (PDA, Smartphone, Netbook, Laptop, Desktop, ATM, etc. The member authentication request may be, for example, associated with a member attempting to access confidential information from the client server or information stored on the computing device. A secure key associated with the member may be determined at the security server, and data associated with the secure key may be transmitted from the security server to the member. Secure key information may be received from the member and validated at the security. Based on the validated secure key information, it may be arranged for the member to receive the confidential information from the client server.

Other embodiments include: means for receiving, at a security server from a client server, a member authentication request associated with a member attempting to access confidential information from the client server; means for determining at the security server a secure key associated with the member; means for transmitting data associated with the secure key from the security server to the member; means for receiving from the member secure key information; means for validating the secure key information at the security server; and, based on the validated secure key information, means for arranging for the member to receive the confidential information from the client server.

In some embodiments, a communication device associated with security server exchanges information with one or more remote devices or via information stored on the device. The information may be exchanged, for example, via public and/or proprietary communication networks.

A technical effect of some embodiments of the invention is an automated ability to authenticate an entity via one or more communication networks. With this and other advantages and features that will become hereinafter apparent, a more complete understanding of the nature of the invention can be obtained by referring to the following detailed description and to the drawings appended hereto.

DETAILED DESCRIPTION

Figure 1:
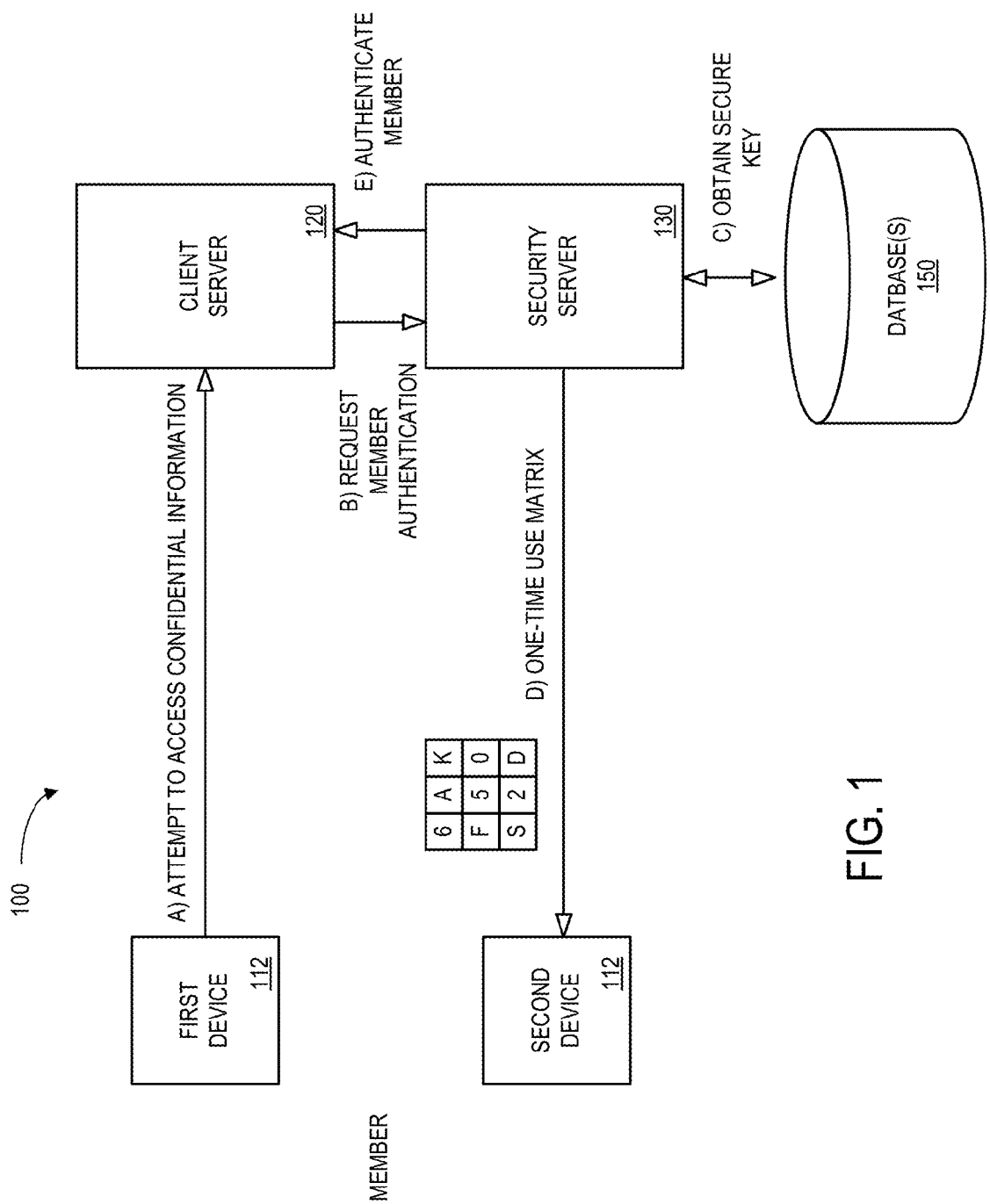
FIG. 1 is block diagram of a system according to some embodiments of the present invention.

FIG. 1 is block diagram of an authentication system 100 according to some embodiments of the present invention. The system 100 may, for example, facilitate the authentication of an entity (e.g., a person) via one or more communication networks.

A number of terms are used herein. For example, the term "member" is used to refer to a user who interacts with features of the present invention to securely access information, or computing device users. For example, a "member" may be a bank customer who uses features of the present invention to login to a bank Website to view their bank account information or to auto-lock their computing device when not in use—and therefore unlocks their device using the invention. A "member" may also be a person who belongs to a social website and who uses features of the present invention to securely login to their account.

As used herein, the term "confidential information" is used to refer to protected information or services that are accessed using a password or other security means. For example, as used herein, the term "confidential information" may refer to access to an account, access to a service, access to data, or the like.

According to some embodiments, a person or "member" exchanges information using one or more devices 112 coupled to one or more communication networks. The devices 112 could comprise, for example, a Personal Computer (PC), a portable computing device such as a Personal Digital Assistant (PDA), a wired or wireless telephone, or any other appropriate storage and/or communication device. As used herein, devices (including the member devices 112) may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

While the term "computer" or "PC" may be used to describe some embodiments, those terms are meant to include any of a number of different kinds of computing or communication devices. For example, features of some embodiments may be used, with desirable results, on PDAs, cellular telephones (including telephones with keypads, such as BlackBerry devices, as well as telephones or other devices with touch screen data entry devices, such as the Apple iPhone, etc.).

According to some embodiments, a member uses a first device 112 in an attempt at (A) to access confidential information from a client server 120. For example, a person might use a PC to attempt to access a web page that contains financial information from his or her bank. As another example, a user might use a Web browser to attempt to log in to an email account, or an Internet membership or social Website. As another example, a user might attempt to log in to a computer (such as a home or office computer). Those skilled in the art will appreciate, upon reading the disclosure, that any of a number of types of information, services, or resources may be securely accessed using features of the present invention.

At (B), a request to authenticate the member may be transmitted from the client server 120 to a security server 130, and a secure key may be obtained by the security server 130 at (C) from a database 150. The secure key might, for example, be a string of alphanumeric characters and/or images that were previously selected by (or assigned to) the member.

A limited use matrix may be transmitted at (D) from the security server 130 to the member. For example, a single or one-time use matrix might be automatically generated and transmitted from the security server 130 to a second device 112 associated with the member. The limited use matrix might include a number of columns, each column containing alphanumeric characters and/or images. The limited use matrix might be randomly generated by the security server 130 such that all elements of the secure key determined at (C) are included within the matrix. One example of a limited-use matrix is described in U.S. Pat. No. 5,428,349 entitled "Nondisclosing Password Entry System," the entire contents of which are incorporated herein by reference.

In some cases, the member selects the columns or rows of a pseudorandom alphanumeric matrix display containing the characters of his or her memorized password—and only those column or row selections are transmitted over a communication channel. Moreover, the identical matrix may be re-created at a host from the common secure key, and each column or row selection can be tested with the character of the stored version to verify it contains the correct characters in the proper sequence.

Note that the second device 112 might exchange information "out-of-band" as compared to the first device 112 (e.g., via a different communication network or through a different communication path within the same network). Consider, for example, a member who uses his or her PC to communicate with a bank server. In this case, the security server 130 might transmit a one-time use matrix to the member's wireless telephone.

If the member is properly authenticated, the security server 130 may provide an indication of approval to the client server 120 at (E). The client server 120 may then provide access to the confidential information (e.g., by transmitting a web page to the first member device 112).

Note that some or all of the elements described with respect to the present invention might be "automatic" or "automated." As used herein, these terms indicate that at least some part of a step associated with a process or service is performed with little or no human intervention.

Although a single client server 120 and security server 130 are shown in FIG. 1, any number of such devices may be included. Similarly, any number of member devices 112 a (and any other devices described herein) may be included and/or combined according to embodiments of the present invention. For example, in some embodiments, the client server 120 and security server 130 might be co-located and/or may comprise a single apparatus.

Figure 2:
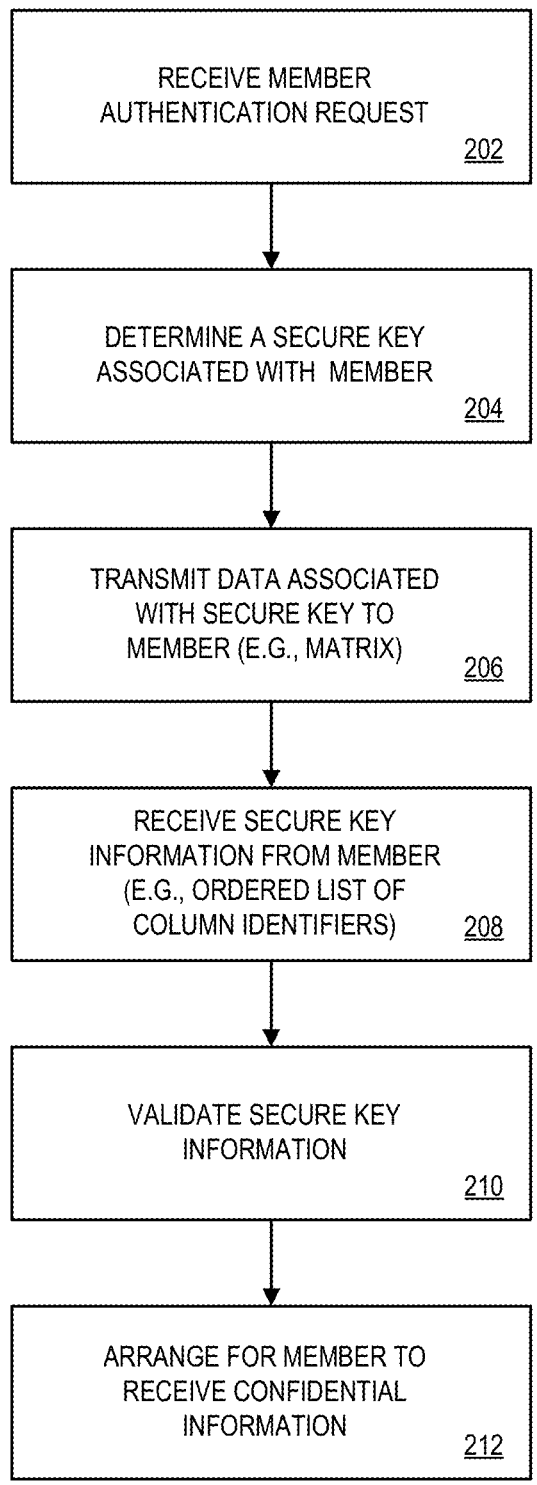
FIG. 2 illustrates a method according to some embodiments of the present invention.

FIG. 2 illustrates a method that might be performed, for example, by some or all of the elements of the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a storage medium may store thereon instructions that when executed by a machine result in performance according to any of the embodiments described herein.

At 202, a member authentication request is received. For example, a security server might receive a member authentication from a client server when a member attempts to exchange (e.g., attempts to receive or provide) confidential information with the client server. According to some embodiments, a client server might perform an initial authentication procedure before forwarding a request to the security sever. For example, the client server might require that a member provide a primary key associated with that member and then validate the primary key at the client server. Such an approach might provide an initial layer of security for the confidential information.

At 204, a secure key associated with the member may be determined. For example, the security server might retrieve a secure key associated with the member from a database. According to some embodiments, the secure key comprises an ordered sequence of symbols, including numbers, letters, pictures, and/or logos. The secure key might have been previously established via interactions between the member and the client server and/or the security server.

At 206, data associated with the secure key is transmitted to the member. Note that the data associated with the secure key might not be the key itself and, further, the secure key might not be determinable from the data. For example, the security server might determine a one-time plurality of symbol sets, wherein the ordered sequence of symbols is included within the plurality of symbol sets. Consider, for example, a matrix of symbols randomly generated by the security server based at least in part on the secure key, with each column in the matrix representing one of the symbol sets. In this case, the all symbols in the actual secure key might be located somewhere within the matrix.

At 208, secure key information is received from the member. For example, the secure key information might comprise an ordered list of column identifiers. Note that information provided to and/or received from the member may be accomplished using more than one communication band. For example, the member might initially attempt to access confidential information via a first band, receive a one-time use matrix via a second band, and provide a list of column selections via a third band. In some cases, the third band may be the same as the first band. For example, the member might communicate with client server via (i) the Internet using a web browser application executing on a personal computer and (ii) the security server via a wireless telephone network using a wireless telephone.

At 210, the secure key information may be validated. For example, the security server might compare the ordered list of columns identifiers received from the member, the symbol sets associated with those columns, and the ordered sequence of symbols representing the secure key. If the column identifiers were provided in the correct order (such that each symbol in the secure key was correctly identified, in order), the security server might determine that the member was in possession of the correct secure key. Note that this may be accomplished without exchanging information (to and/or from the member) that could be used by an unauthorized third party to re-create the key. For example, even if an unauthorized third party visually or electronically intercepted the information and/or keys activated by the member, the secure key could not be re-created.

At 212, based on the validated secure key information, it may be arranged for the member to receive the confidential information from the client server. For example, the security server might indicate to the client server that the member has provided sufficient information to verify his or her identity.

Figure 3A:
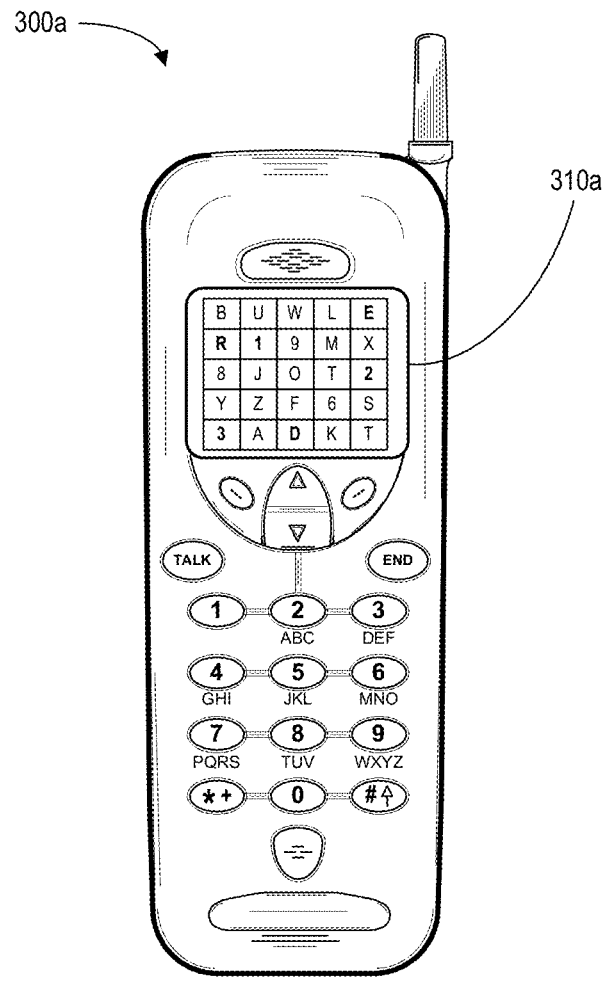
FIGS. 3A, 3B, 3C, and 4 illustrate displays in accordance with some embodiments of the invention.
Figure 3B:
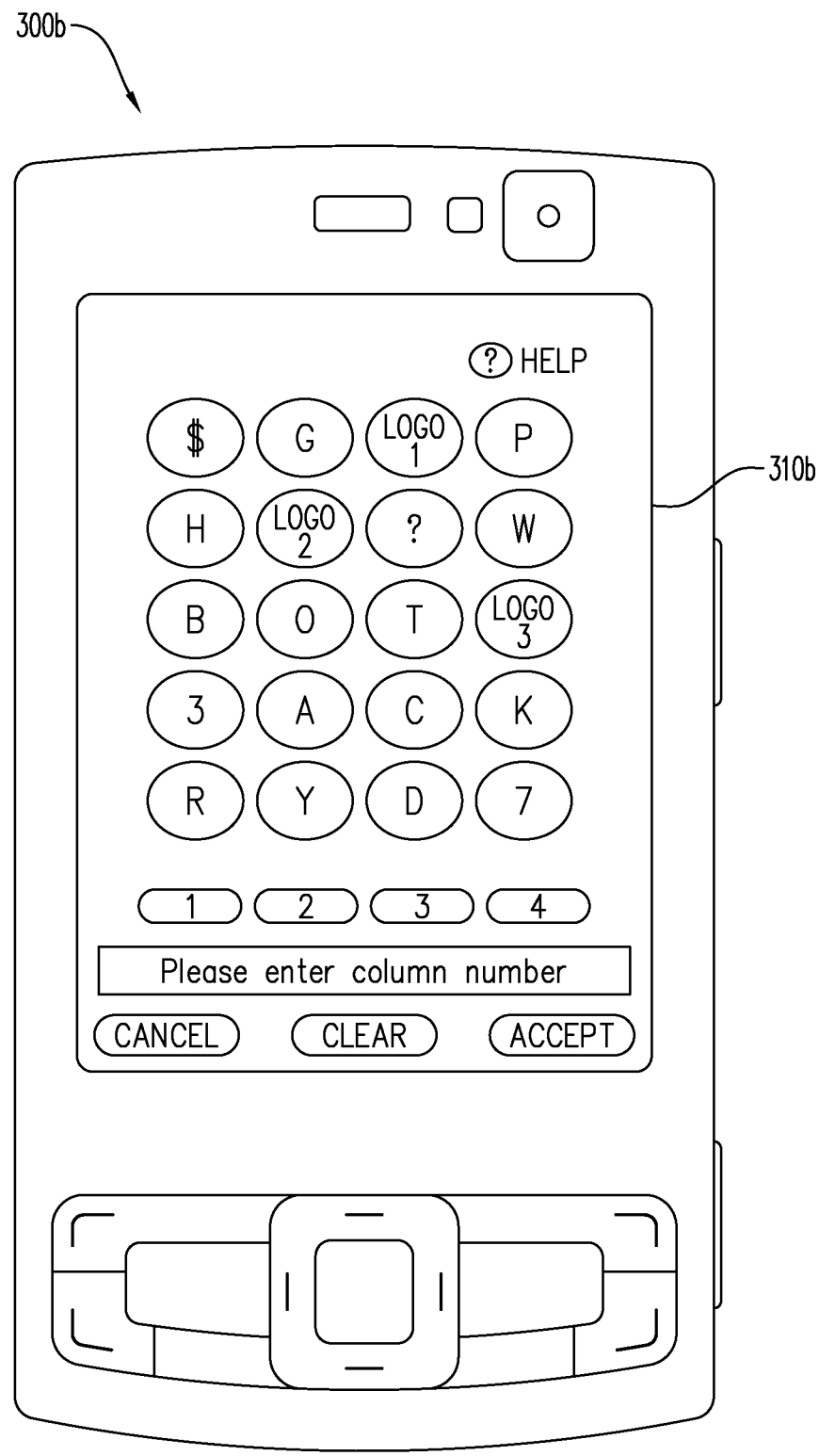
Figure 3C:
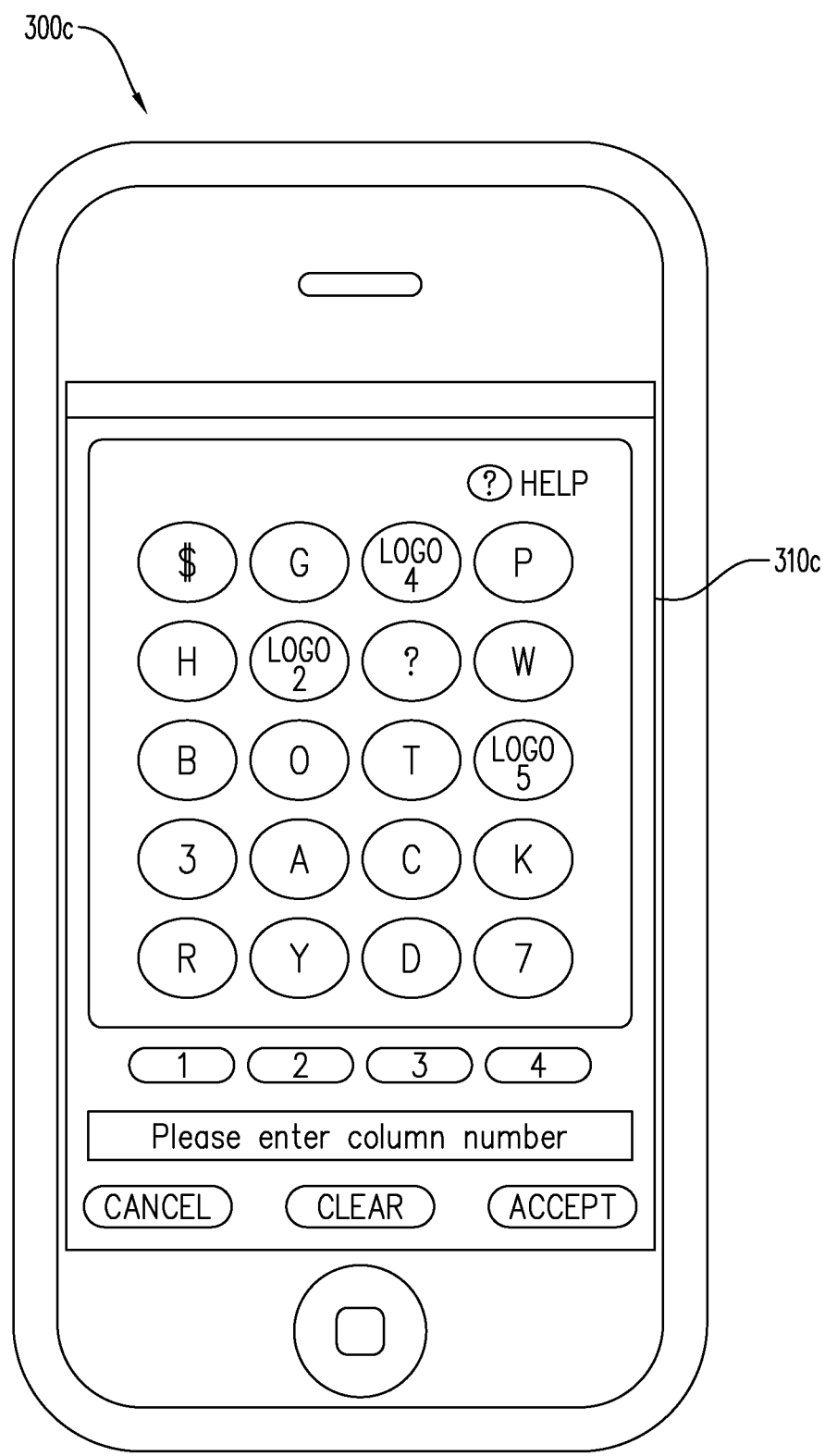

Consider, for example, a member who has selected "123RED" as his or her secure key. In this case, the security server might transmit a one-time use 5-by-5 matrix 310a of symbols to his or her wireless telephone 300a as illustrated in FIG. 3A. Referring now to FIG. 3B, another illustrative display (this time on another style of wireless telephone 300) is shown. In FIG. 3B, the wireless telephone 300 displays a 4-by-5 matrix 310b of symbols. The user interacts with the matrix 310b using the data entry features of the wireless telephone 300b. Still another illustrative display is shown in FIG. 3C. Those skilled in the art will appreciate that a wide variety of different matrix sizes and displays may be used with features of the present invention.

Figure 4:
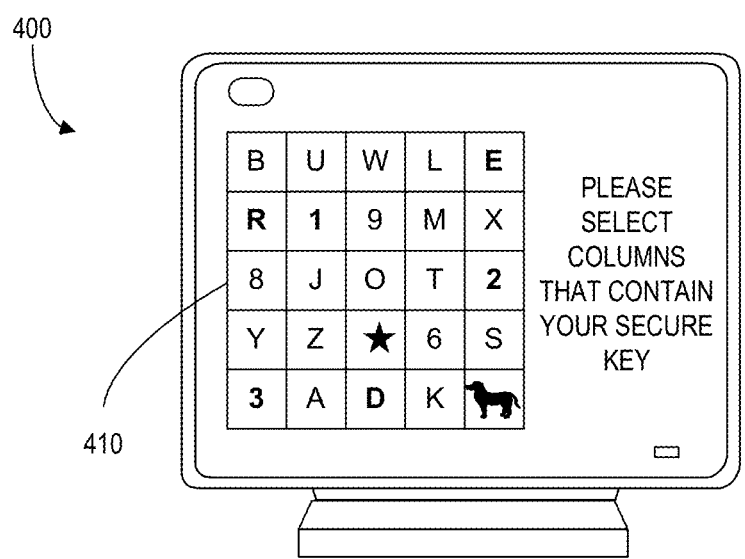

Note that all characters in the secure key are included within the matrix 310. As another example, a matrix 410 might be displayed on a PC or notebook computer monitor 400 as illustrated in FIG. 4. Note that either matrix display 310, 410 could be used by the member to select an ordered list of matrix columns that correspond with his or her secure key. In the present example, the member would select columns 1, 5, 3, 2, 5, 1 as being associated with "123RED." Note, of course, that other arrangements of symbol sets could be used instead (e.g., a member might select column row identifiers).

Figure 5:
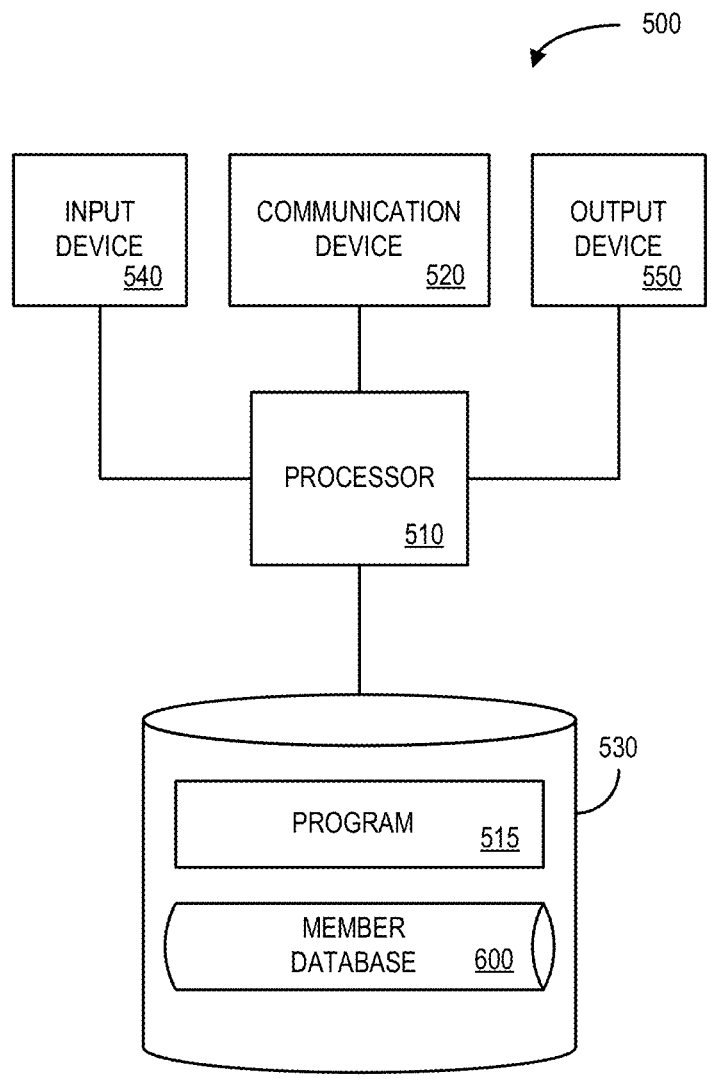
FIG. 5 illustrates a security server in accordance with an exemplary embodiment of the invention.

FIG. 5 illustrates security server, platform, or engine 500 that might be descriptive, for example, of the server 130 illustrated in FIG. 1 in accordance with an exemplary embodiment of the invention. The security server 500 comprises a processor 510, such as one or more INTEL® Pentium® processors, coupled to a communication device 520 configured to communicate via one or more communication networks (not shown in FIG. 5). The communication device 520 may be used to communicate, for example, with one or more remote member devices and/or client devices.

The processor 510 is also in communication with an input device 540. The input device 540 may comprise, for example, a keyboard, a mouse, or computer media reader. Such an input device 540 may be used, for example, to enter information about members and/or clients. The processor 510 is also in communication with an output device 550. The output device 550 may comprise, for example, a display screen or printer. Such an output device 550 may be used, for example, to provide reports and/or display information associated with members and attempts to access confidential information.

The processor 510 is also in communication with a storage device 530. The storage device 530 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 530 stores a program 515 for controlling the processor 510. The processor 510 performs instructions of the program 515, and thereby operates in accordance any embodiments of the present invention described herein. For example, the processor 510 may receive, via the communication device 520, a member authentication request associated with a member attempting to access confidential information from the client server. The processor 510 might also determine a secure key associated with the member and transmit data associated with the secure key (e.g., a matrix) to the member. The processor 510 may also receive from the member secure key information, validate the secure key information, and arrange for the member to receive the confidential information.

As used herein, information may be "received" by or "transmitted" to, for example: (i) the security server 500 from participant devices, document conversion systems, review systems, and/or claim processor devices; or (ii) a software application or module within the security server 500 from another software application, module, or any other source.

As shown in FIG. 5, the storage device 530 also stores a member database 600. An example of a database that may be used in connection with the security server 500 will now be described in detail with respect to FIG. 6. The illustration and accompanying description of the database presented herein is exemplary, and any number of other database arrangements could be employed besides those suggested by the figure.

Figure 6:
FIG. 6 is a tabular view of a portion of a member database in accordance with some embodiments of the present invention.

FIG. 6 is a tabular view of a member database 600 in accordance with some embodiments of the present invention. The table includes entries identifying a member that may be authenticated that have been issued by a security server. The table also defines fields 602, 604, 606, 608, 610 for each of the entries. The fields specify: a member identifier 602, member information 604, a secure key 606, a single-use matrix identifier 608, and matrix information 610. The information in the database 600 may be created and updated based on information received from members and/or client devices.

The member identifier 602 may be, for example, an alphanumeric code associated with a member who has enrolled with a client or a security service. The member information 604 could represent, for example, information about the member such as his or her name, address, communication identifier, and/or associated client or client account number. The secure key 606 may be a password defined by the member and might include numbers, letters, images (e.g., "img1"), etc. The single-use matrix identifier 608 could comprise, for example, a pointer indicating where a matrix (randomly generated based at least in part on the secure 606) is stored. According to some embodiments, the single use matrix might instead be stored directly within the database 600. The matrix information 610 might indicate, for example, when the matrix was generated and/or whether or not the member has been successfully authenticated using the matrix.

Thus, the security server 500 and member database 600 may be used to provide strong access authentication technology affording an online web user with an enhanced login security feature. Such a one-time password authentication method may, moreover, avoid clumsy and/or cost prohibited attributes associated with physical hardware fobs, tokens, biometrics and/or smart cards.

In addition, the approaches described herein may give members and/or clients a secure, marketable, economical and easy-to-use packaged solution. Through the use of a customized keypad, a member or user may act as the encryption point while selecting their secure key from a randomized Graphical User Interface (GUI) display such as the displays 710, 720 illustrated in system 700 of FIG. 7. This mechanism may convey to users that they are not just more secure, but they are involved with the security instrument itself.

According to some embodiments, the secure key approach described herein may transform the user's password characters into column numbers during the login keying and safely sends it over the web with reduced worry of having the password being trapped copied or captured via hidden key logging software or hidden cameras over the user's shoulder. It may also prevent or impede the progress of phishers that attempt to lure Internet users via e-mails to counterfeit Web sites (disguised as trusted companies) in order to get sensitive data, such as their user identifier, password, and/or credit card information.

Figure 8A:
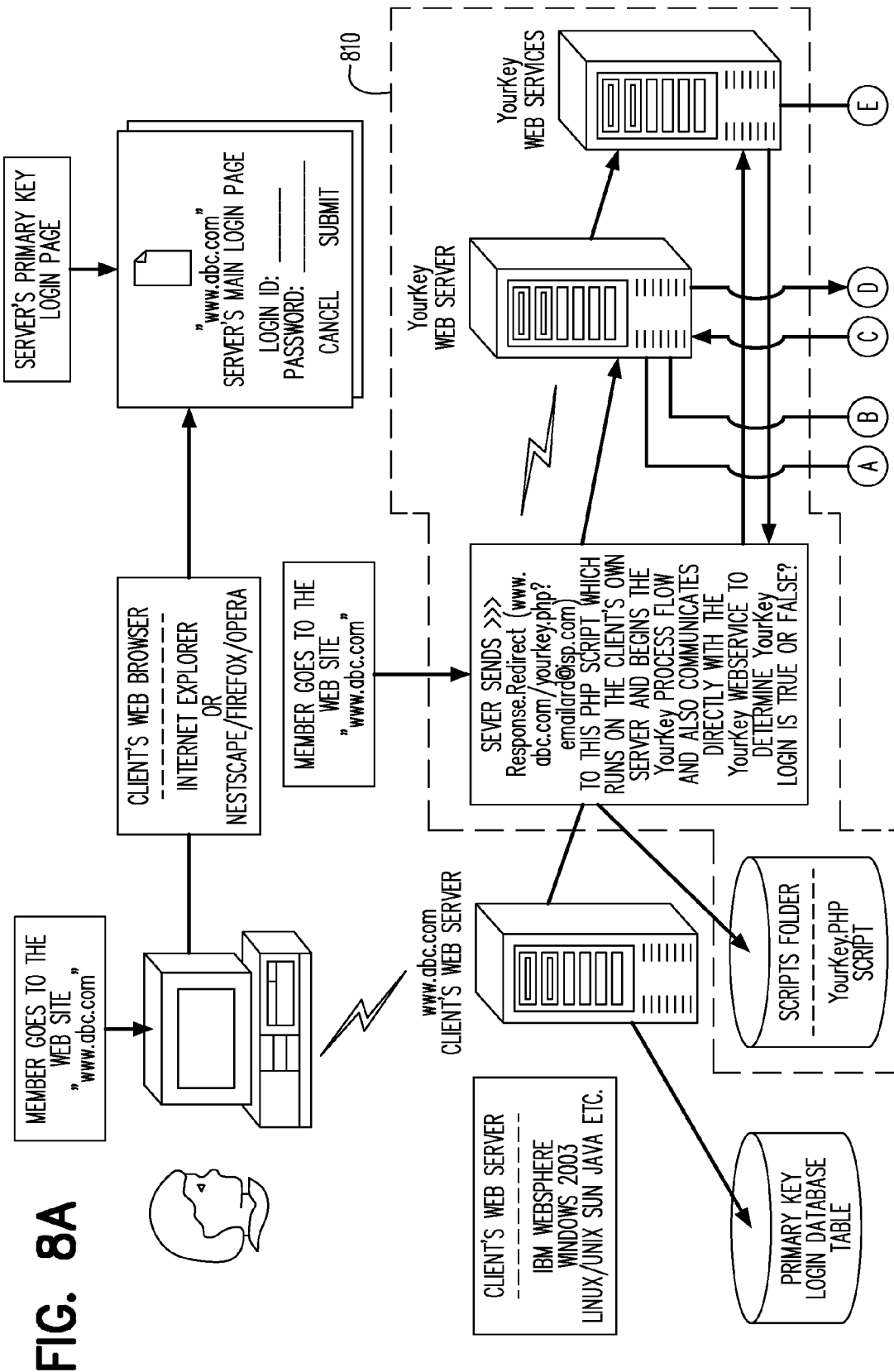
FIGS. 8A and 8B are a block diagram of a system in accordance with an exemplary embodiment of the invention.
Figure 8B:
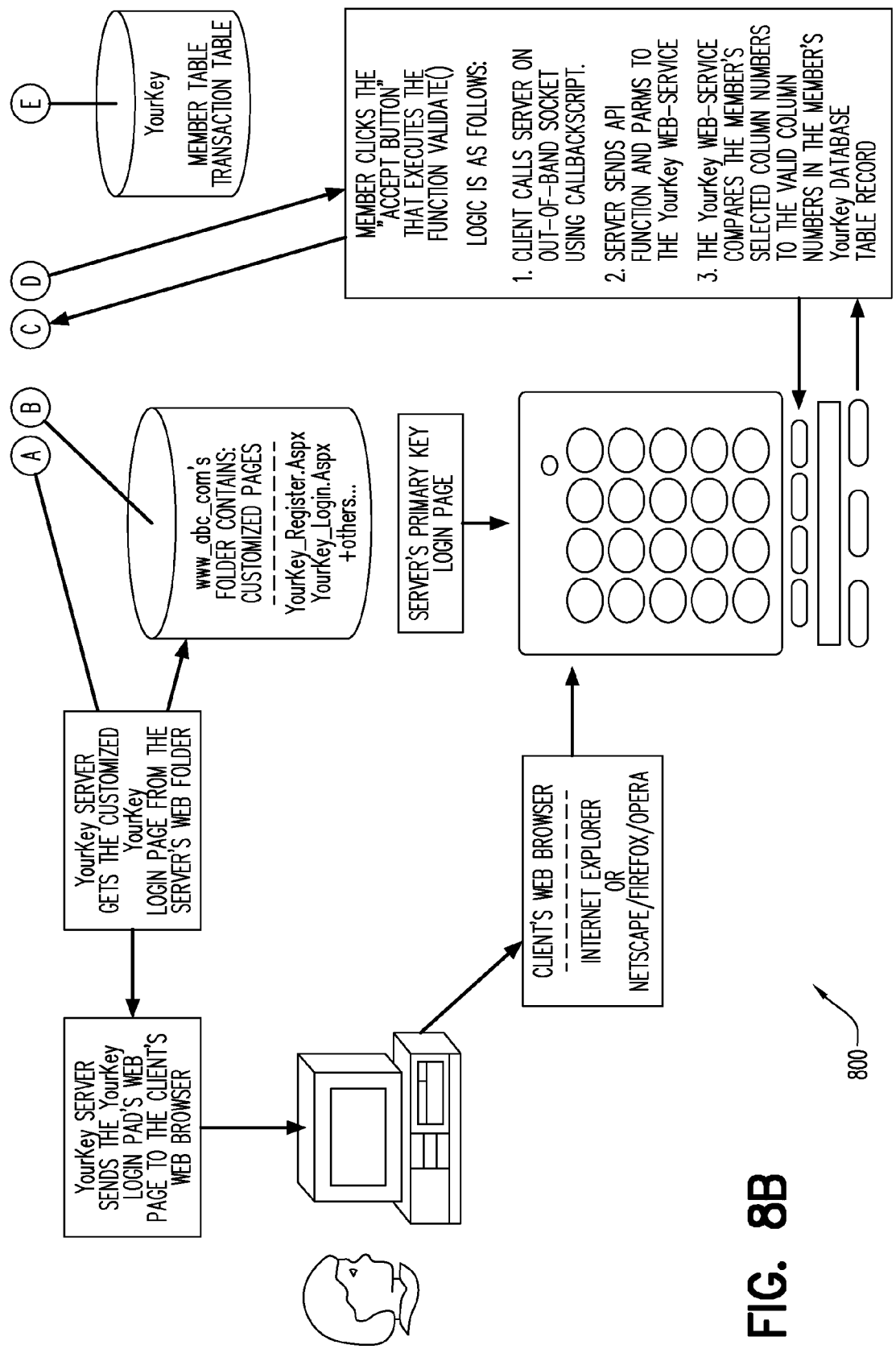

As illustrated by way of example, in the system 800 of FIGS. 8A and 8B, some embodiments described herein may be implemented using Microsoft .NET web service technology that is installed inside a client's firewall and/or that executes alongside a client's online application web server that is locally or remotely hosted. Only minor adjustments might be required to the client's existing users interface system. For example, the adjustment might include adding just one PHP script to the client's web server folder and is called after an initial "primary login" is authenticated. A web service may comprise, for example, a collection of protocols and standards used for exchanging data between applications or systems and software applications written in various programming languages and running on various platforms can communicate with the web services described herein. An advantage of web services may be ubiquity across platforms and languages. A PHP script running on Linux might, for example, communicate with an Internet Information Server (IIS) server on a Windows box using Active Server Pages (ASP) without any communication problems. When the server switches over to Solaris, Apache, and Java Server Pages (JSP), everything may transition with limited problems.

Some embodiments described herein may be implemented using Service Oriented Architecture Protocol (SOAP) web service format for passing messages across a network and calling functions on remote computers. The use of such web services may let the system 800 share data across many platforms and hardware configurations. For example, a Java web service may be created and used by another element using a .NET client.

The following describes one example of software coded logic that could be employed by the secure key web service Application Programming Interface (API) according to some embodiments of the present invention. This is an illustrative example, and those skilled in the art, upon reading this disclosure, will realize that other keypad sizes and different combinations of icons, text or images or the like may be used.

A client's server may call a "Yourkey.PHP Script" that then calls a Web Service API function to perform certain action required to process a member's login. The web service may, for example, determine if the member's email address calling is a normal or pre-verified member. This might be noted or indicated in the member's database row or column during an initial registration process (e.g., when the member might have been prompted for a mobile phone number and wireless carrier name). In order to send a text message, for example, the system 800 might use an email address type format like "2035551212@vtext.com," where @vtext.com is the short name for Verizon Wireless Carrier. If the member is a non verified member (or the transaction being performed by the member doesn't require extra security) then the member's normal 20 icon keypad may be randomized (scrambled) and transmitted back to the calling server requesting the secure service login keypad. If it truly is a pre-verified or "two-factor type" member, then the following logic flow might executed to handle the security service.

The web service program may randomly create a keypad that implements a cryptographic Random Number Generator (RNG) using the implementation provided by the .NET Cryptographic Service Provider (CSP) to create 20 random icons of 4 columns and 5 rows consisting of the following set of icon types selected in the order shown below:

13 letters (with no duplications out of 26 letters), −1 after each selection;

2 numbers (with no duplications out of 10 numbers), −1 after each selection;

2 symbols (with no duplications out of 8 symbols), −1 after each selection; and 3 images (with no duplications out of 48 images), −1 after each selection.

As a result, a total of 20 icons may be determined to create the Random Generated Keypad. After the program randomly picks the 20 icons from the above types the system 800 may then store the image icon names with folder prefixes into an array. This string array may then be passed to a special function that will randomize (scramble) the entire array of 20 entries using, for example, the following pseudorandom number generator provided by the Microsoft .NET Library:

System.Security.Cryptography.RNGCryptoServiceProvider.

The 20 entry string array may now be ready to be converted to standard html code and transmitted by the security server back to the caller's browser for display on the member's monitor with all the necessary text input boxes and control buttons required to enter the column numbers that match the member's computer-generated password and column numbers sent to their mobile device as a short text message. The actual sending of a keypad to member and calling the member's mobile device may be performed microseconds apart within the web service function. In many cases, and depending on the carrier's Short Message Service (SMS), the text message may take up to 20 seconds to be transmitted to member's mobile device.

The last part of the two-factor function logic may be to randomly select a password of 5 to 8 characters long from the 20 entry icon array that makes up the members keypad being displayed back on the callers browser. Using the pseudorandom number generator provided by the Microsoft .NET Library System.Security.Cryptography.RNGCryptoServiceProvider the system 800 may request a random number between 1 and 20 (minus any duplications of the random number) and then, using this random number, compute the column number that matches the icon number and save for sending to the member's mobile phone later in the process.

After the system 800 has created the 5 to 8 character password, it may use the 20 icon array and newly created password to update the member's database table row with the newly generated keypad and password.

Figure 7:
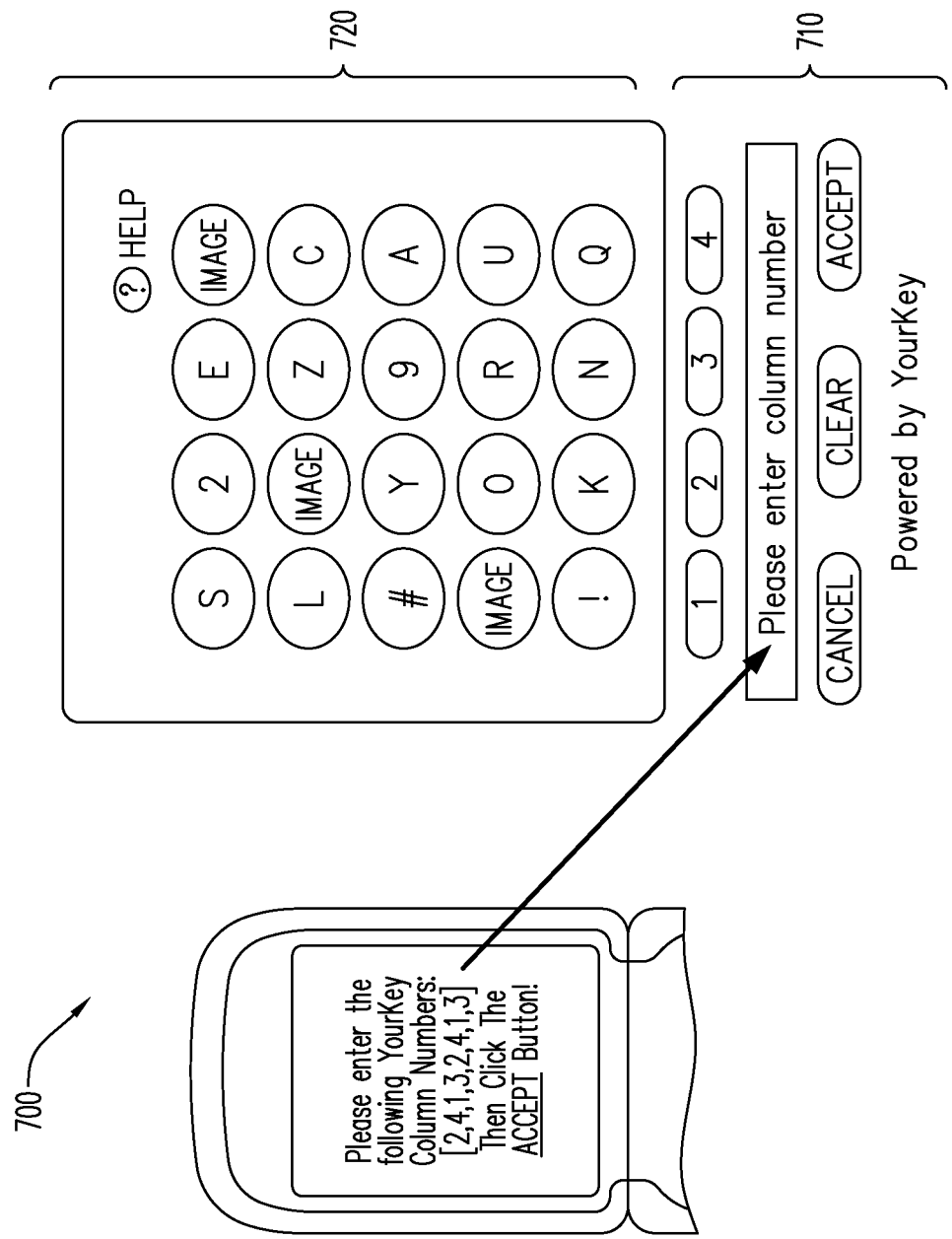
FIG. 7 illustrates some graphical user interface displays in accordance with some embodiments of the present invention.

The web service function may now create a small html text message to send to the member's mobile device. The system 800 may get the mobile phone number (and @carrier name) from the member's database table row and format a text message to transmit to the mobile device (e.g., as illustrated in FIG. 7). The member will see the mobile text message on their mobile device's display (with a normal transmit time being, for example, 20 to 40 seconds) along with the instructions to enter or click the column numbers on the keypad to complete their secondary password login to the client's web site.

The member must enter the correct column numbers, according to some embodiments, on the first attempt or they will receive another text message (and a whole new keypad will be generated). Note this requirement to be valid on first attempt might represent an additional security measure that prevents an unauthorized party from having the opportunity to try and guess the correct columns on three or more attempts (as is often done with typical keypad login methods). Thus, the above logic may be repeated, all over again, if the member doesn't enter the correct column numbers on the first attempt from their mobile device. If the member cannot correctly enter the column numbers after a pre-determined number of attempts they may be asked to answer a challenge question. If the challenge question is answered correctly, the member might be allowed to attempt login again or reset the registration method. If the challenge question is not answered correctly, the member might need to call or email a customer support for further assistance.

Note that elements 810 of FIGS. 8A and 8B may help let a client determine directly from a web service that a member has completed the registration and/or login process on a security server.

In this manner, a system may be provided that allows for the secure authentication of members via communication networks. Moreover, authentication may be achieved without having a member explicitly enter his or her secure key.

Figure 9:
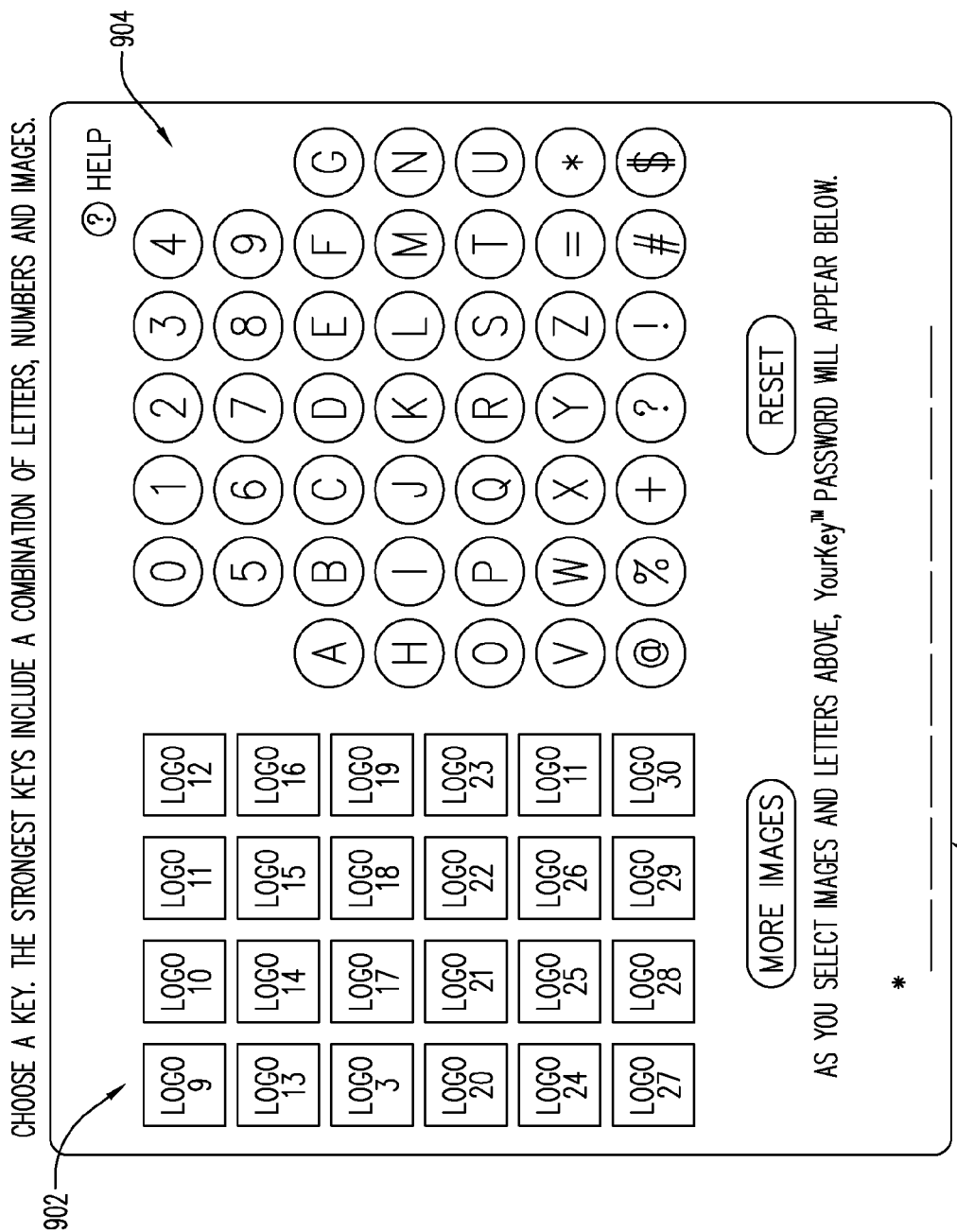
FIG. 9 illustrates some graphical user interface displays in accordance with some embodiments of the present invention.

The matrix and user interface pursuant to the present invention may be used to promote, market or advertise goods or services. For example, in some embodiments, one or more of the images in the limited use matrix of the present invention may be an image such as an advertising logo or icon. In some embodiments, one or more advertising icons, logos or images may be selected by a member or user when selecting a password. For example, referring now to FIG. 9, a display 900 is shown which represents an illustrative display that may be presented to a member when setting up or changing a password for use with embodiments of the present invention. As shown, a series of graphical images 902, such as advertising icons, logos or images are displayed along with alphanumeric characters 904. The member may thus incorporate one or more graphical images 902 in a password. In this manner, embodiments may be used to reinforce the brand recognition or marketing messages of one or more advertising partners. Pursuant to some embodiments, the graphical images 902 may include one or more company logos, photos, special images, or the like. In some embodiments, the graphical images 902 may be supplied directly by advertising partners such as the advertisers themselves, ad agencies, or third party ad serving networks.

Note that the graphical images 902 may be stored in different places according to different embodiments and/or different types of icons. For example, English alphanumeric characters and control characters might be stored at the user device (e.g., wireless telephone) along with a security application or program. As another example, corporate logos or icons might reside a security server and after installation may further be stored on the user device. As still another example, "custom" icons might be downloaded by users onto their device (e.g., either for free or in exchange for a small purchase fee) and may or may not be part of the device's password or PIN. Still other embodiments might be associated with advertisements, personal movies, photographs, and/or audio files (e.g., mp3 files) stored at the user's device. Moreover, note that according to some embodiments, the key or PIN might be stored only in the user's device (e.g., a PIN might never be transmitted to a security back end database or server). In this case, a process may be implemented to "unlock" the device when the user has forgotten his or her PIN.

In some embodiments, one or more graphical images 902 may be uploaded onto a server (such as, for example, the server 810 of FIGS. 8A and 8B) and automatically resized or proportioned for use with the matrix of the present invention. In some embodiments, one or more graphical images 902 are static images (e.g., they are not hyperlinked to any other pages). In some embodiments, one or more graphical images 902 are dynamic or clickable links. For example, in some embodiments, one or more graphical images 902 are associated with one or more URLs that are either specified by the advertiser (e.g., the URLs point to a location on an advertiser controlled website), or by an entity operating or controlling the system of the present invention (e.g., the URLs point to a location on server 810 of FIGS. 8A and 8B or some other location). In this manner, members using features of the present invention may be presented with advertising during a sign-in process and may click on a graphical image 902 to find out more information about a product or service.

Figure 10:
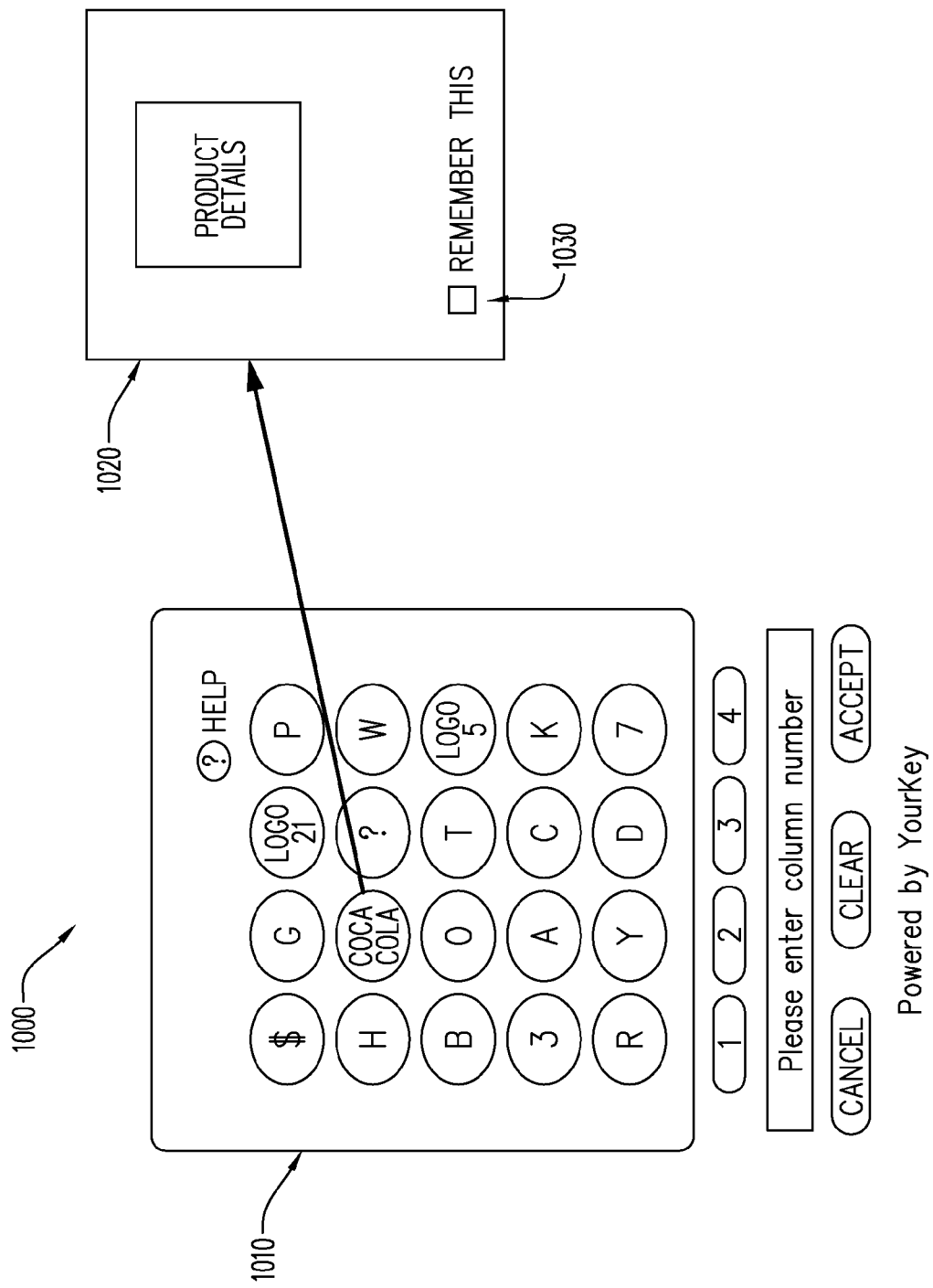
FIG. 10 illustrates some graphical user interface displays in accordance with some embodiments of the present invention.

An illustrative example of one embodiment of the present invention in which graphical icons are used which are dynamic or clickable is shown in FIG. 10 where a user interface 1000 is shown having a matrix 1010 in which a dynamic graphical icon representing the Coca Cola® brand is shown. When a user mouses over or clicks on the graphical icon, a window 1020 is generated with further details about the brand. In the illustrative user interface 1000, a simple brand image is shown, however, those skilled in the art will appreciate that any type of marketing material may be presented including, for example, targeted offers, discounts, coupons, product details, etc. In some embodiments, an option 1030 such as "Remember This" or "Send More Information" or the like may be presented in the window. By selecting or opting into the option 1030, a member may receive further details regarding the marketing presentation or material (e.g., a member may receive an email or other communication about the offer). In this manner, the overall use of the matrix remains simple and uncluttered, and the log-in process is not disrupted by overly-intrusive marketing offers. Those skilled in the art will appreciate, upon reading this disclosure, that other advertising techniques may be used in conjunction with the present invention, including, for example, the presentation of contextual ads (e.g., presented on the side, top, or bottom of the matrix). The contextual ads may be selected based on demographics or preferences associated with each member so that each member enjoys targeted advertising that is relevant to their interests or preferences.

Pursuant to some embodiments, one or more of the graphical icons (such as the icons of FIG. 10) may be or include animated images. For example, in some embodiments, graphical icons used pursuant to the present invention may include animated images. For example in some embodiments, one or more images may be animated graphics interchange format ("GIF") images. In this manner, a single location of the matrix may be used to display several different images by cycling through different images in the single GIF. As a more specific, illustrative, example (again referring to FIG. 10), the Coca Cola image in the matrix 1010 may be an animated GIF image that cycles through a series of different images. For example, the animated GIF may cycle through three different Coca Cola brand images to reinforce the Coca Cola brand to users. As another example, the animated GIF may cycle through three different brand images (e.g., the GIF may loop through a display of a Coca Cola image, a BMW image, and an NBA image). In this manner, each matrix location may be used more efficiently, allowing a large number of brand or image impressions during a typical login sequence. The term "animated GIF" is used to refer to any image format that allows the animation cycling of images in a single file (e.g., such as Flash or other formats). In some embodiments, multiple image files may be used and the images may be cycled through using code that automatically refreshes or cycles through the image (e.g., using Javascript, PHP or the like).

Figure 11:
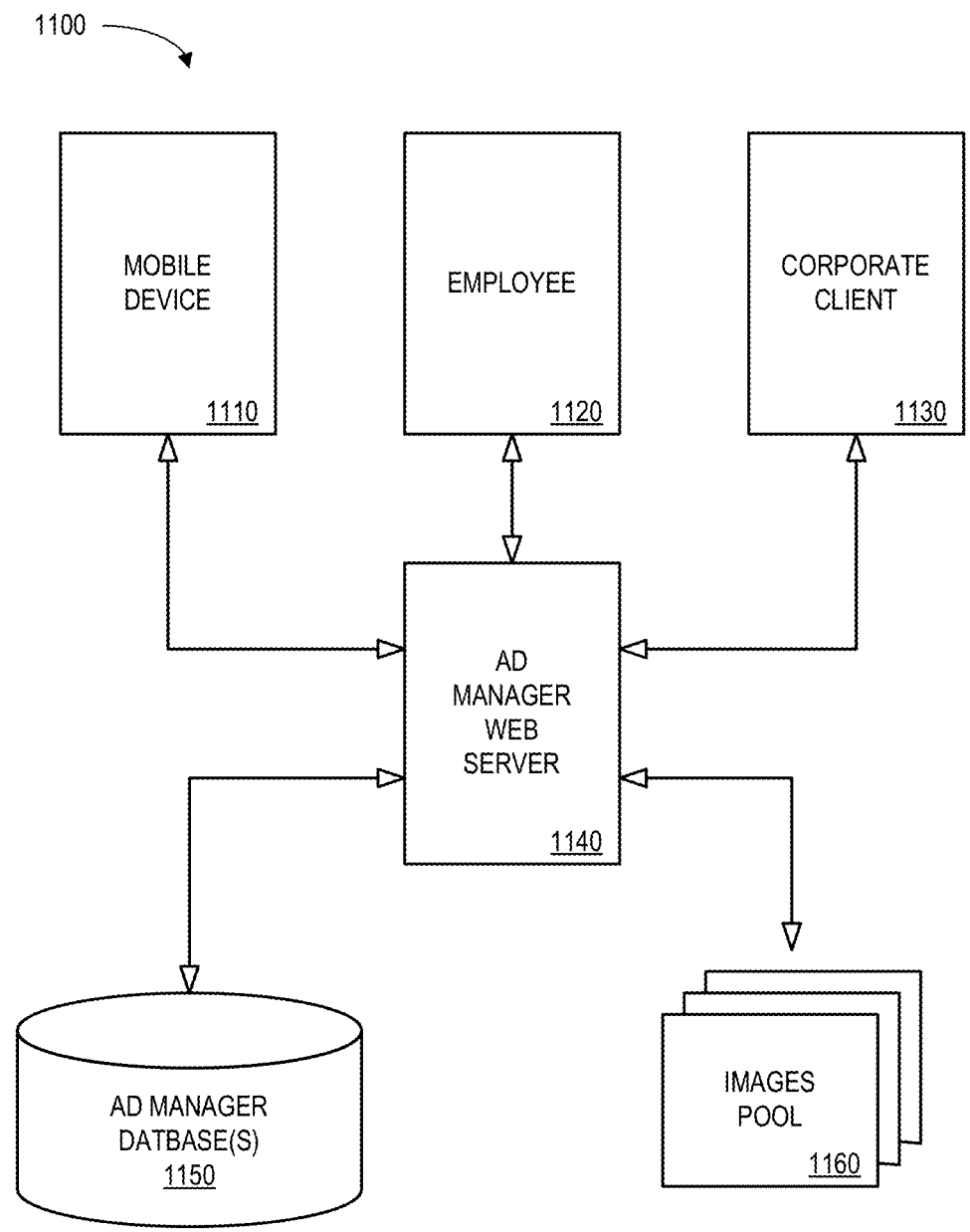
FIG. 11 illustrates an advertising management system according to some embodiments.

Thus, systems may use advertisements to enhance brand loyalty in connection with a security application. FIG. 11 illustrates one advertising management system 1100 according to some embodiments. The system 1100 may include a mobile user device 1110 that exchanges information with an advertising manager web server 1140. For example, a mobile user might download a security application to his or her device 1110. The advertisement manager web server 1140 might then receive a "new user registration" email message. In response, the advertisement manager web server 1140 might transmit a "welcome" email message with more registration details to the mobile user device 1110. The mobile user may then complete installation by selecting a new PIN. The mobile user may further register by entering his or her personal information via an advertisement manager web service application.

The advertisement manager web server 1140 may also exchange information with an employee 1120 (e.g., an employee of a security provider). For example, the employee 1120 may create a schedule via an advertisement manager web application using information from a client. The information might, for example, be downloaded to mobile user devices 1110 once a day or whenever the schedule is updated.

The advertisement manager web server 1140 may also exchange information with a corporate client 1130 (e.g., a client who advertises via the system 1100). For example, the client 1130 might upload advertisement images to the web server 1140. The client 1130 might also select a schedule, budget, and/or place an order via the web server 1140. The advertisement web server 1140 may store information in one or more advertisement databases 1150 (e.g., associated with a MICROSOFT® SQL server) and/or an images pool 1160 having a server director structure.

Figure 12:
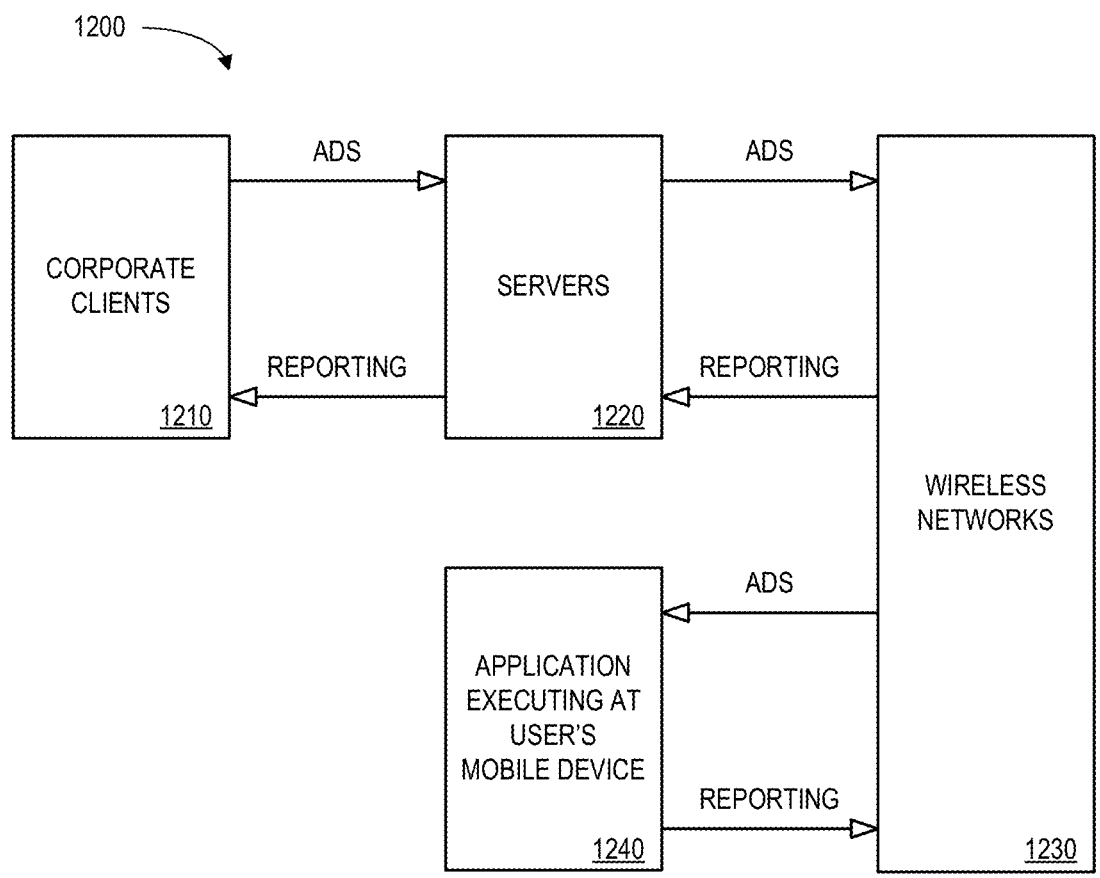
FIG. 12 illustrates an advertising network according to some embodiments of the present invention.

FIG. 12 illustrates an advertising network 1200 according to some embodiments of the present invention. According to some embodiments, corporate clients 1210 may transmit advertising information to servers 1220 associated with a security application. For example, the clients 1210 might transmit graphical images associated with company logos or icons to the servers 1220. The servers 1220 may then transmit the advertising information to an application 1240 executing at a user's mobile device via one or more wireless networks 1240. The wireless networks 1240 may be associated with, for example, telephone networks such as SPRINTED or VERIZON®. The mobile device 1240 may then provide reporting information (e.g., indicating how often a user viewed or selected a particular corporate logo) to the servers 1220 via the wireless networks 1230. The reporting information may then be compiled and transmitted to the corporate clients 1210.

Some or all of the elements of the advertising network 1200 might be associated with a high availability physical architecture, including a combination of environmental, process, software and computing hardware enhancements that help reduce the time that the security application and system are not available. For example, the servers 1220 may comprise a Windows or Linux server that is designed and managed to operate with only a small amount of planned and unplanned downtime. Moreover, clusters of networked and grouped (e.g., two or more) highly available servers and shared disk drives may be used to support each other in the event of failure of one server or a network component.

Similarly, highly available packages (e.g., one or more applications and/or database instances grouped together by some logical method) may be utilized such that both a primary node for the package (the node the package will run on under normal conditions) and one or more adoptive nodes for the package may be used as nodes the package will run on if the primary node has failed. According to some embodiments, each package will have an IP address assigned. This address may move from one node to another during failover so that users will always connect and re-connect to the same address. Note that that this IP address may be different than the IP address of the node.

According to some embodiments, each package may have a separate group of disks associated with it, containing data needed by the package's applications. The group of disks may be taken from a shared disk pool for a cluster. Note that two packages might not share the same group of disks. Each file system created from this group of disks may also have unique mount points (directory structures). If two packages are sharing the same directory structure, one package may not be able run when these two packages try running on the same machine. Moreover, each package may have monitors and services. As used herein, a "service" may refer to an application program or resources that are needed by the package to run properly. A "monitor" may refer to a program that is keeping up with the health of the package components. If a service fails or a monitor senses a problem, the package may be halted or restarted on another server within the cluster.

Figure 13:
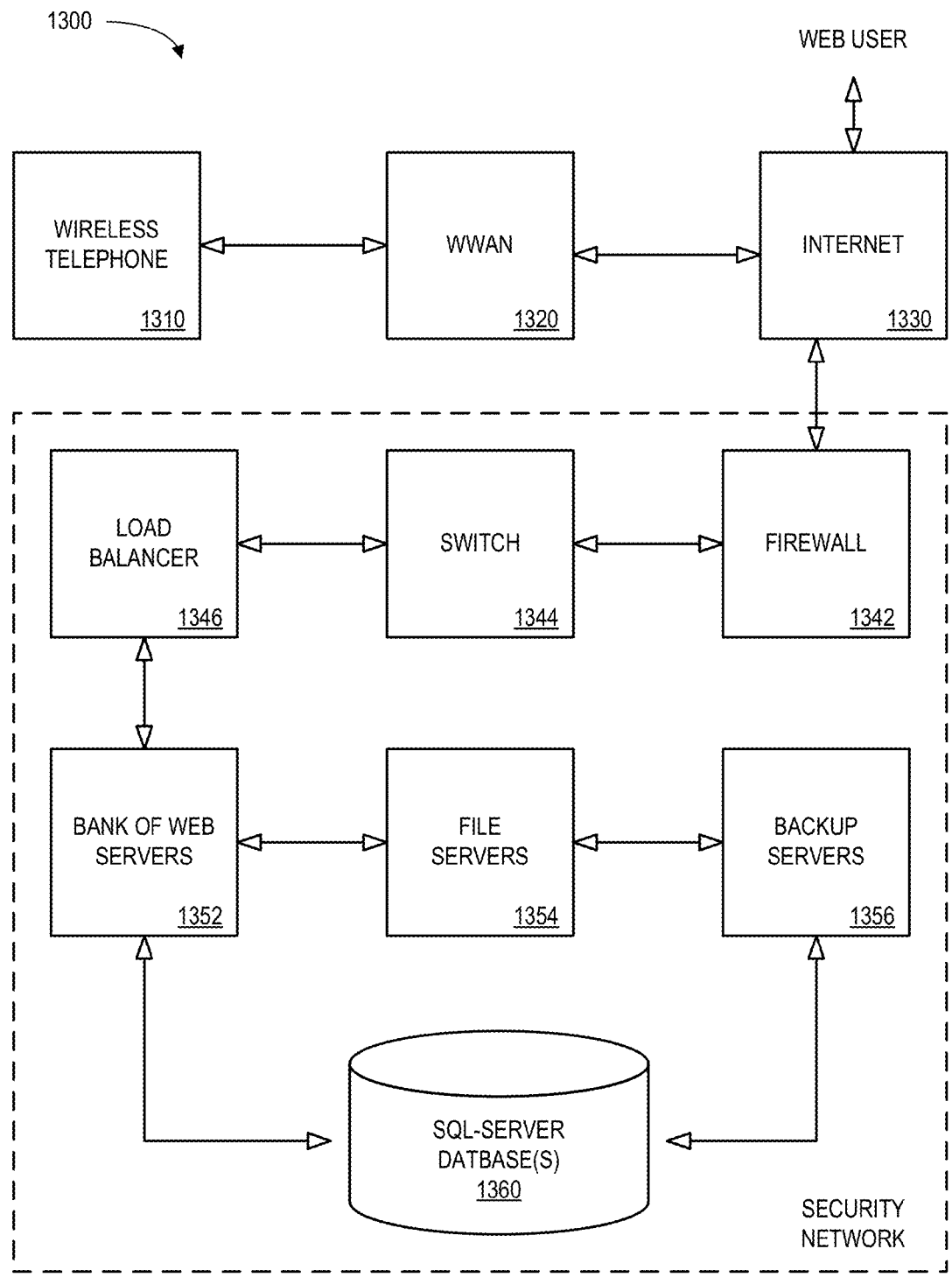
FIG. 13 is a physical architecture diagram according to some embodiments.

FIG. 13 is a physical architecture diagram 1300 according to some embodiments. In this example, a web user may access a security network via the Internet 1330 or via a wireless telephone 1310 via a Wireless Wide Area Network ("WWAN") 1320. In either case, information may be exchanged with the user via a firewall 1342, a switch 1344, a load balancer 1346, and/or a bank of web servers 1352 associated with the security network. The web servers 1352 may, for example, exchange information with one or more file servers 1354 and/or SQL-server databases 1360. According to some embodiments, one or more backup servers 1356 may be provided to ensure the reliability of the security network.

According to some embodiments, the system of FIG. 13 may be used to deliver a security application to the wireless telephone 1310 via an "over-the-air" download. Initial seeding for the security application may be provided, for example, via a website associated with a corporate center.

The initial seeding may also be provided via an advertising manager web server (e.g., in connection with a "Get Security Application For Your Phone" selection). In this case, the user may provide a mobile phone number to the advertising manager web server and the system may send an SMS message that includes an appropriate URL to the mobile. The user may then click on the link to launch his/her mobile browser (or type it on his/her browser) and download the security application.

According to some embodiments, different security application versions are installed in different network devices based in different make and/or model versions of the devices. For example, a first wireless network might not want a logo associated with another wireless network to appear in connection with the security application. As another example, some phones may use a 15 button configuration while others support 16 buttons.

Figure 14:
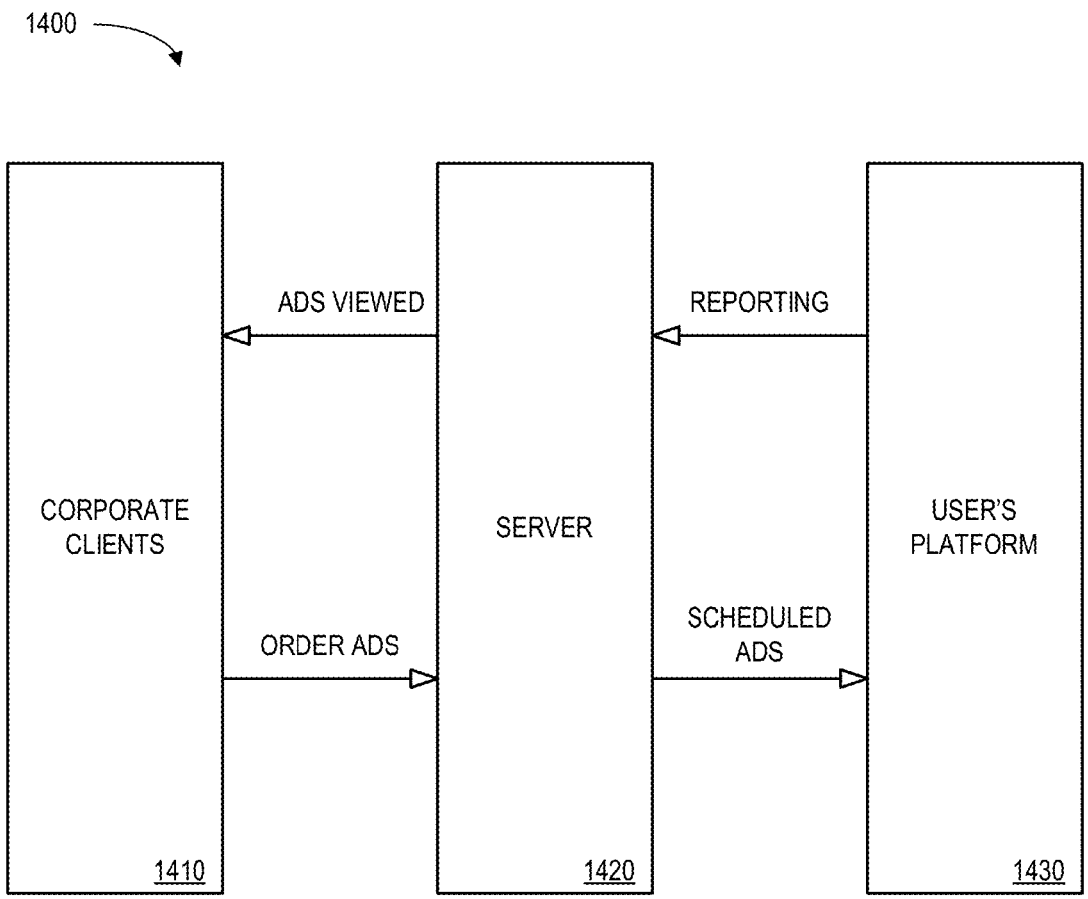
FIG. 14 is an information flow diagram according to some embodiments of the present invention.

FIG. 14 illustrates a system 1400 according to some embodiments wherein corporate clients 1410 transmit orders for advertisements to a security application server 1420 (e.g., including payment information and graphical images to be used on icons on PIN entry displays). The server 1420 may then schedule the advertisements for deliver to a user's platform 1430. The user's platform 1430 may report how often the user has viewed and/or selected each advertisement and the server 1420 may compile this information and inform the corporate clients 1410 about how many users have viewed the advertisements.

According to some embodiments, a current security application user may select a "Send security application to a Friend" option to send an SMS to a friend who may then download the security application. According to other embodiments, a current security application user may activate a security application web application's "Send security application to a Friend" to send an SMS to a friend who may then download the security application. According to some embodiments, referring a friend in these ways could result in a reward (e.g., points, themes, or free ringtones).

According to some embodiments, the security application product is delivered and installed as a "Home Screen Replacement." The standard behavior for this type of application may be that after installation, for example, the next time the user encounters the standard home screen, he or she is instead first asked whether they would like to proceed to the standard telephone home screen or the security application home screen. This may be a system-supplied prompt (e.g., not under the security application's control). The user can choose either home screen, and also have the option to set one or the other as the default home screen. If he or she sets the security application as the default, the user will no longer be presented with the home screen choice, they will instead launch directly into the security application PIN entry screen. At this point once he or she has chosen the security application as their default, the user has effectively "locked down" their phone such that the system will always force the user to enter their security application PIN prior to accessing any functionality on the phone. If the phone user decides they no longer wish to use security application, they can reset their home screen default from within the Settings application of the telephone.

A user might submit registration information for a security application in any of a number of different ways. For example, the user registration might be initiated at the security application web site or a manufacturer's site. In this case, the mobile user might connect via the device's browser to a GOOGLE® Android web site or to web pages associated with wireless service providers. As another example, user registration might be initiated via an SMS send to the device (e.g., from a friend's phone or via a web page request).

In order to request advertisements from the server, the security application may first register with the server. This may be done, for example, as a single http request. Knowing its network and its device's make/model may be helpful for getting the appropriate version of the security application (and the right schedule for advertisement).

The user may then be prompted to enter information on the device's security application. The information might include, for example, a user ID representing a security application unique user ID. This user ID might also be defined and used in other instances (e.g., it may be the security application user's primary email address, it may be used by an algorithm to generate a security application "Identification Code," it may be passed as a unique identifier for any subsequent Application-to-Server http requests, and/or it may be the security application backend system's primary communication method to the security application mobile user). According to some embodiments, a second email address might be requested (e.g., to facilitate resolving lost PIN situations).

The user may also be asked to provide his or her primary telephone number. In some cases, this number cannot be used for receiving the Identification Code, since the device would be locked while the user is trying to recover his email. However, the user may still receive an SMS on this phone confirming that an "Identification Code" has been sent and his/her security application PIN may have been changed. According to some embodiments, a secondary mobile phone number may be requested (e.g., a secondary mobile phone that supports SMS). This mobile phone might be owned by a person that is trusted by the user (e.g., the user's mother or spouse) and may be designed to be used as an option when required to communicate (via SMS) the "Identification Code" to the user (when he or she forgets a PIN). According to some embodiments, the user also indicates or selects the name of his or her wireless carrier (e.g. AT&T or T-Mobile).

The information provided by the user might be updated, for example, via the mobile security application. According to some embodiments, process is available for updating the above information from the advertising manager web server application. The updates are then "pushed" by the security application to the security application database over the network. Such an approach may provide improved security. Note that the information may be used in subsequent http requests made by the security application to the server.

By way of example, the following is one XML format for the security application user initial registration:

```
- <yourkey>
   - <InitialRegistration>
      - <userinfo userid="JohnSmith@gmail.com"
         useremail2="JaneDoe@myemail.com"
         userphone="9145550958" userphone2="2035554561"
   carriername="AT&T">
      </userinfo>
   - </InitialRegistration>
- </yourkey>
```

If registration is successful, the server may return a code of "0" in its response:

```
- <yourkey>
   - <registration>
      - <response>
         - <code>0</code>
      - </response>
   - </registration>
- </yourkey>
```

If there is a registration error, the error code might be returned in the response, along with a description of the error:

```
- <yourkey>
   - <registration>
      - <response>
         - <code>-1</code>
         - <msg>Registration Failed</msg>
      - </response>
   - </registration>
- </yourkey>
```

If the security application registration fails, the security application may attempt a registration on the user's behalf the next time it runs. If registration continues to fail, the application might not be able to obtain any advertising schedule from the server or submit tracking information. Please note that advertisements might not be returned in response to the registration request, this may instead be a standalone http request specifically designed to handle security application registration. It may be the case that the user's downloaded and installed version of the security application itself provides the user with a satisfactory pre-installed set of keypad images including sponsored advertisements.

According to some embodiments, the security application may be associated with two different screen configurations or formats based on the number of buttons that a user device can display simultaneously). For example, a "16-button" security application screen format might be appropriate for an "Android" type user device while a "15-button" security application screen format might be appropriate for a Blackberry type user device. Moreover, according to some embodiments, a maximum number of log-in attempts (e.g., 10 attempts) might be allowed before locking a user out. After lock out, the security application may require an identification code to unlock the device.

Both a "16-button" and "15-button" security application screen format might require a five symbol long PIN, and at least one of the symbols may need to be an icon. The screen configurations may remain "static" (e.g., the buttons might not be randomized at a press of a button). However, the security application may randomize the buttons every time the user turns the device on and successfully enters his/her PIN. If the user doesn't enter his/her PIN successfully, the same buttons may be display at the same screen locations, until security application unlocks.

Figure 15:
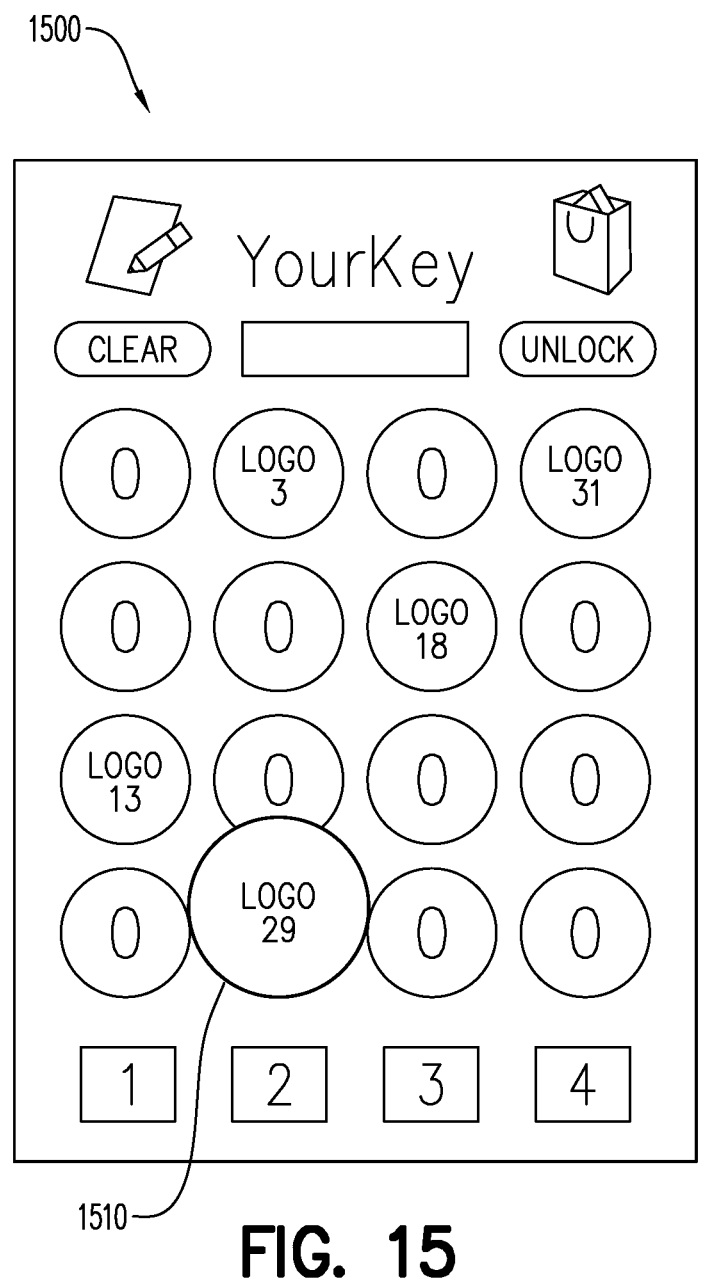
FIG. 15 is one example of a highlighted icon according to some embodiments.

According to some embodiments, a "highlight" option can be turned on/off by the user via a security application menu. The highlight option may, for example, draw a user's attention to one of the symbols on the entry pad by making the symbol larger than other symbols, flashing the symbol, rotating or otherwise animating the image, and/or by have the size and/or brightness of the symbol pulsate in size or brightness on the display (e.g., a "heartbeat effect"). By way of example only, FIG. 15 illustrates a display 1500 including a highlighted icon 1510. According to some embodiments, only one icon has the highlight effect at a time, and a security application server or advertisement scheduler may determine which symbol should currently have the highlight. In some cases, a highlighted icon 1510 might indicate that a special offer is available to the user in connection with that company.

Some user devices may have a hard keyboard instead of a touch screen. In this case, entering a security application PIN (e.g., via a trackball) may require a different procedure. For example, a user might either use the device's trackball to select and enter an icon for his/her PIN, or the device's keyboard to enter his/her security application PIN including one or more icons. In some cases, a user could use the trackball and the hard-keyboard in combination. For example, a user might use the device's trackball to select and enter his/her security application PIN. He or she might then either press the trackball or the device's "spacebar" button to select an icon or a character button. Each time the user highlights a button or an icon, the icon may pop-up and stays this way until the user moves to another button.

According to some embodiments, each security application character or number links to an appropriate hard-button on the device's hard-keyboard. For example the hard-keyboard "Y" button may link to the security application's "Y" icon, the "4" to "4", the "b" to "b", etc. According to some embodiments, an icon could be linked to a character or number by the user. At the new PIN setup screen, and after the user selects an icon as a part of his/her PIN, a screen with all of the keyboard's characters and numbers might be displayed to assist the user linkage to the recently selected icon to a character or number. For example, the user might select the following PIN: J G E<Pepsi> <BMW> (where <Pepsi> and <BMW> represent graphical logos). Assuming he or she assigned the character "P" for the "Pepsi" icon and the character "W" for the "BMW" icon. The user may then use the following PIN on his/her Blackberry hard-keyboard to unlock his/her device: J G E P W. According to some embodiments, the user can also use the device's trackball in addition to the hard-keyboard. This may be, for example, useful when the user forgets his or her personally defined links between keys and icons.

According to some embodiments, an authentication screen may be presented to a user each time he or she starts the security application. The screen may consist of rows and columns of numbers, letters and images which are buttons that can be tapped by the user to enter their PIN. The numbers, letters and icons presented to the user may be chosen from a predefined set of images which includes the user's actual PIN images, plus a random selection of letters numbers and images which are not part of the users' PIN.

The set of keys initially displayed may include the characters in the user's PIN, placed at random locations in the grid. After each button press by the user, the buttons on the screen may, according to some embodiments, be randomly redrawn. After the user has pressed the buttons in the sequence representing their PIN, pressing an "accept" button will attempt to authenticate the PIN against one stored in connection with the user. If there is a match, the user proceeds into the application. If there is no math, the user may retry, or exit the application.

Upon successfully entering a security application PIN on the keypad, the security application home screen application may launch the original devices "home screen launcher", providing the user with full access to their applications and data. When the user powers off the device, the next time it is powered on he or she will be required to re-enter the security application PIN. Similarly, if the device goes into inactivity/sleep mode, upon waking the user will be required to enter their PIN.

Figure 16:
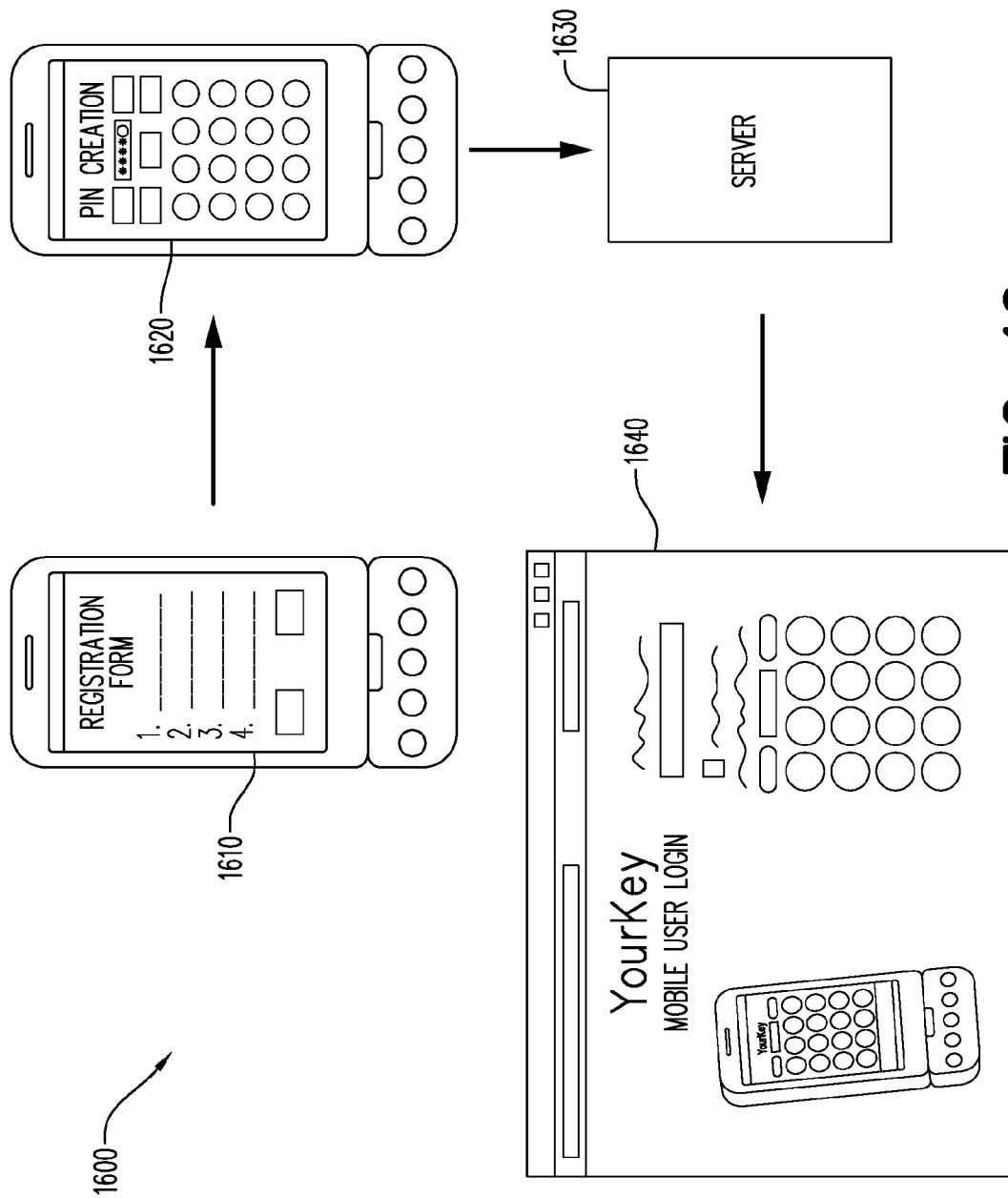
FIG. 16 is a user flow diagram according to some embodiments of the present invention.

FIG. 16 is an illustration 1600 of a new user installation and registration process. Initially, the user may complete a registration form 1610 on the device to provide his or her name, email addresses, etc. The user may then use a display 1620 to create a PIN which will be used to access their stored information. According to some embodiments, PINs are composed of both alphanumeric characters and graphical icons (e.g. PEPSI and BMW logos).

Note that one or more rules may need to be satisfied before a user-selected PIN is accepted. For example, a valid PIN might need to be at least keys long and might need to include at least one graphical image (e.g., it could be his or her four digit ATM code plus one additional icon).

Upon program launch, a security application may determine if a PIN has already been set. If one has not been set, the user may be presented with the security application PIN creation screen 1620. The PIN creation screen 1620 may present the user with a simple screen that allows him/her to enter a PIN using a combination of alphanumeric characters and one or more icons. When a user enters his/her security application PIN, he/she may then tap a "Done" button to save it.

He/she will be asked to confirm his/her PIN by now entering it in a security application authentication screen, before storing it. Note that the security application PIN might only be stored in the device and never transferred to the backend database. The security application may offer users a way to recover their security application PIN (and thus their data) in the case where their security application PIN is lost or forgotten. Information about the new user (e.g., his or her name and email address but not including the PIN) may be transmitted from the user device to a server 1630. The server 1630 may then arrange for the user to complete the registration process online via a web page 1640.

To help a user recover a forgotten PIN, the security application may utilize a user-specific "identification code." For example the identification code may be generated by an algorithm based on the user's User-ID (e.g., his or her primary email address) and the current date. The same algorithm code may run in both the security application advertisement manager server and the security application mobile application. The security application identification code may, for example, have a one day life-span. After that, the user may need to request another identification code.

Upon receiving the identification code from a web page, the device first compares it with the identification code that was compiled in the device with today's date. If authentication fails, it compares it with another one that was compiled on the device with tomorrow's date. If this also fails, it compares it with the one that was compiled on the device with yesterday's date. If still not a much, then it displays an error message to the user. The reason for running the multiple-date procedure is because of calendar/time setup differences between the device's date keeper and the web server and time zone issues.

To comply with regulation, a security application may provide an "emergency call" icon on the initial 6-button and the 15-button screen configurations. When the user presses the "emergency call" button, the phone's dial-up screen may be displayed without enable other phone features (e.g., "contacts" and "call logs" would not be enabled). When the user is finished with his/her emergency call, the security application screen may be re-displayed.

Figure 17:
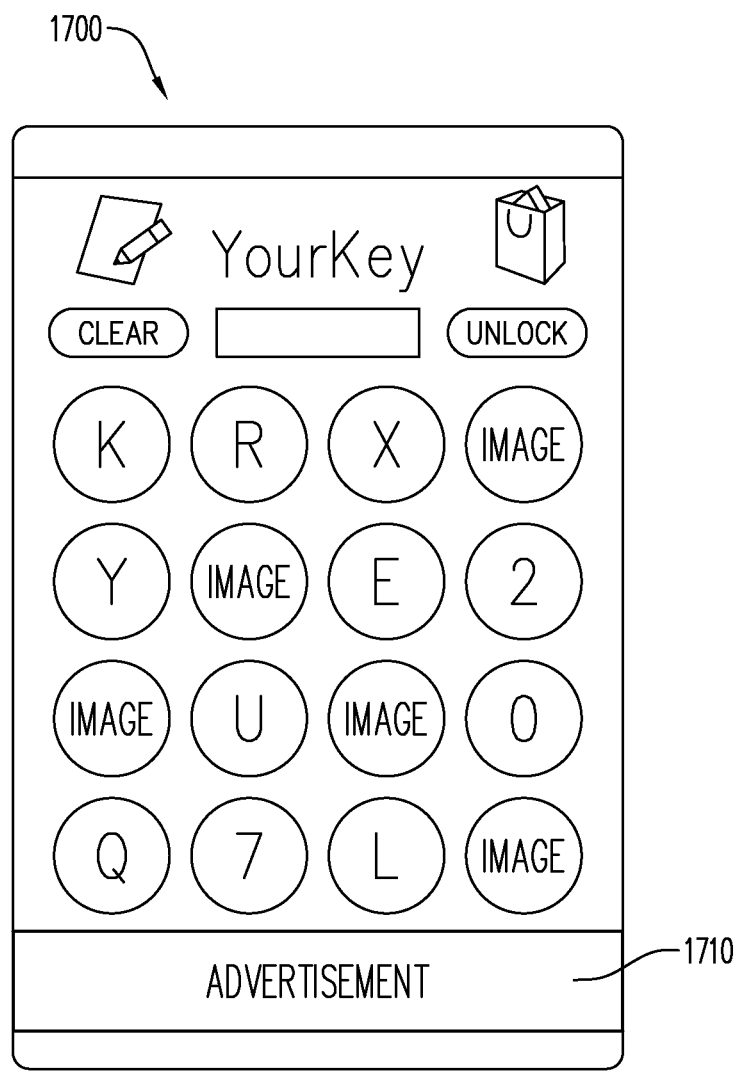
FIG. 17 illustrates a display with an advertising bar according to some embodiments.

According to some embodiments, an advertising area or "bar" may be provided on a security application display. For example, FIG. 17 illustrates a display 1700 including an advertising bar 1710. The advertising bar 1710 might be, for example, associated with the Google AdSense service to provide an efficient way for publishers to increase revenue by displaying targeted, unobtrusive advertisements. The bar 1710 might also let the security application provide search functionality for the users.

Figure 18:
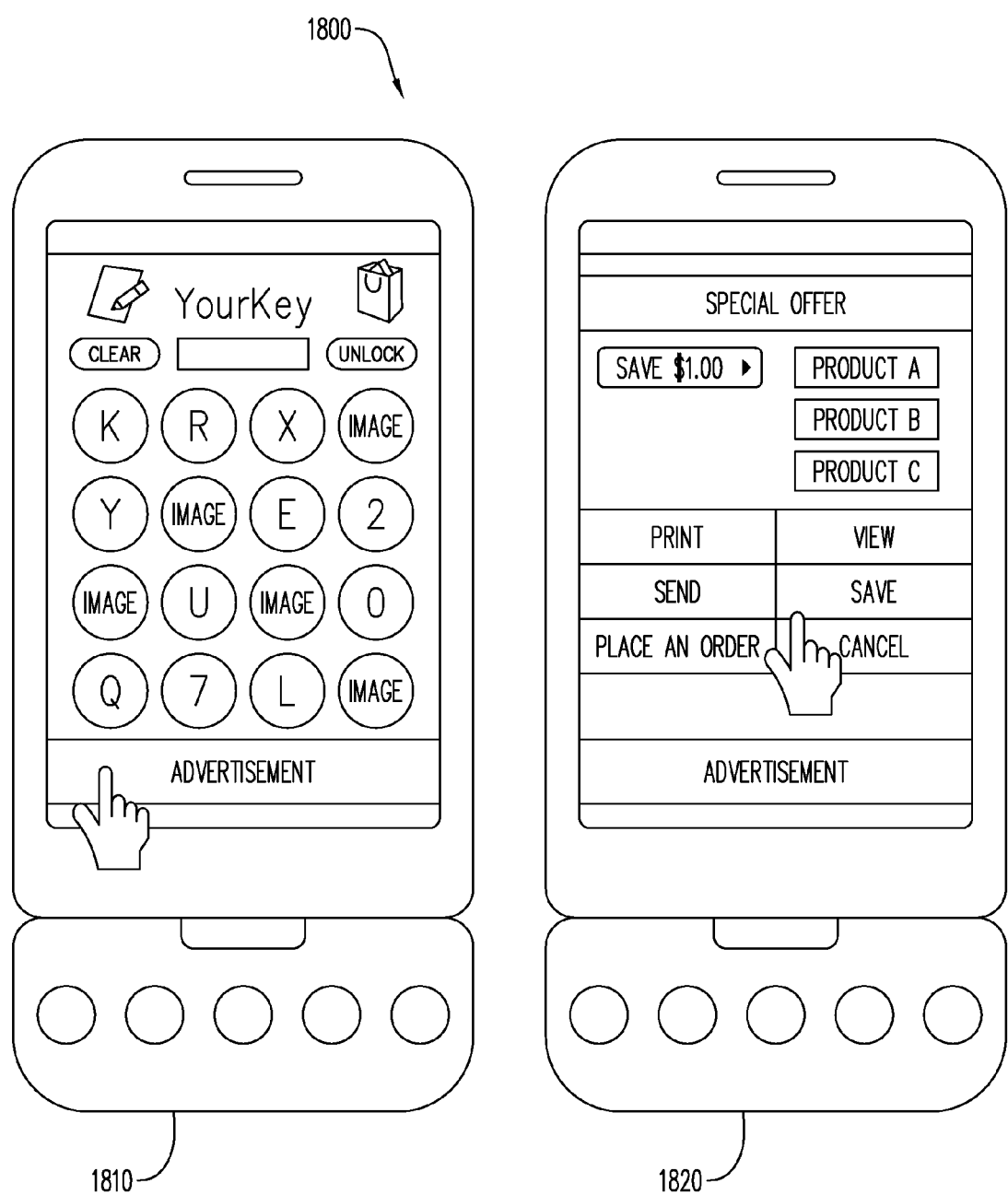
FIG. 18 illustrates one example of a selection of an advertising bar according to some embodiments.

FIG. 18 illustrates 1800 a first display 1810 wherein a user is selecting or activating an advertisement bar. After selection, a second display 1820 includes a menu that is provided to the user based on his selection. The second display 1820 might, for example, let a user receive a special offer, print (e.g., to a local printer), view more details, send (e.g., to an email address or mobile phone number), save, order the product, and/or cancel in connection with the advertisement bar. When "place an order" is selected, for example, the security application might open the devices web browser and direct the user an appropriate web page.

Figure 19:
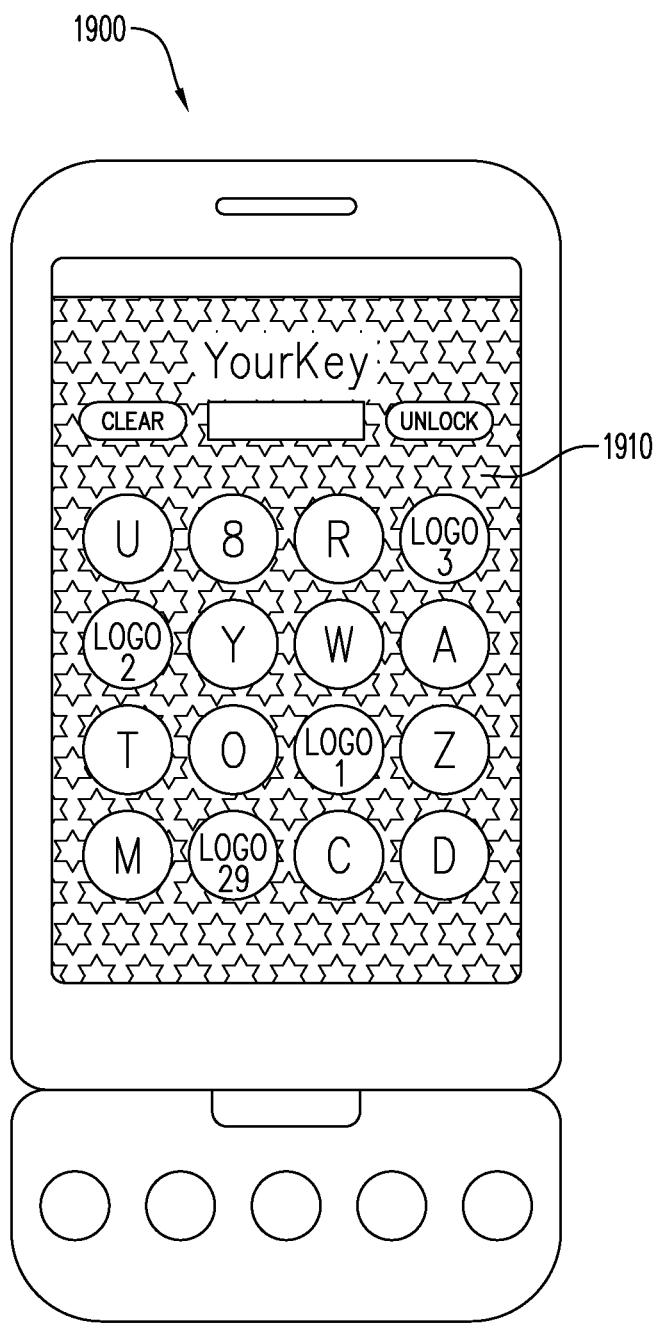
FIG. 19 illustrates a display including a wallpaper background image in accordance with some embodiments.

In some cases, users like to customize their mobile device by establishing different types of ringtones in connection with various functions. In a similar way, a security application might let a user establish customized "backgrounds" or "wallpapers" for his or her display. For example, FIG. 19 illustrates a display 1900 including a user-selected background 1910 theme. According to some embodiments, theme features may be offered as an incentive for the users to register their personal information. The user might, for example, need to register his/her personal information in order to receive free theme packages. According to other embodiments, a user may be able to purchase a particular background 1910 (e.g., associated with a favorite sports team). Still other themes might reflect real-time local weather conditions or his or her daily horoscope.

Figure 20:
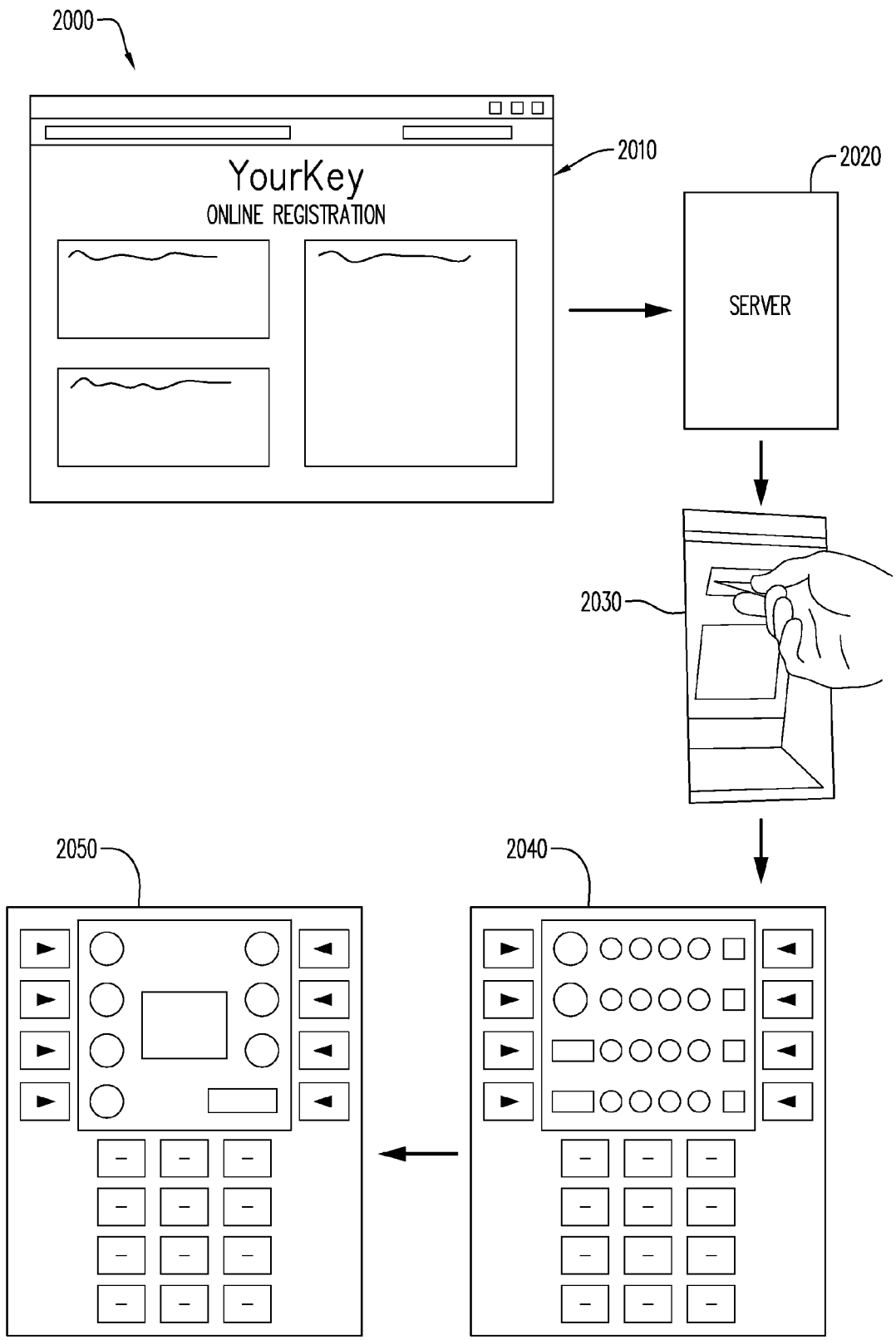
FIG. 20 is an example of an automated teller machine flow in accordance with some embodiments.

Thus, embodiments have been described wherein a user may interact with a mobile device and/or a web page to exchange information via a security application. Note, however, that other devices may also be associated with the security application. For example, an Automated Teller Machine (ATM) device might display a randomized keypad including icons in accordance with any of the embodiments described herein. FIG. 20 illustrates a system 2000 wherein a user completes an online registration form to provide information to a security server 2020. Information might also be synchronized with NYCE banking servers and/or networks. When the user presents an identification card to an ATM device 2030 (e.g., his or her bank, credit, or debit card), the ATM may provide a display 2040 that lets corporate icons be entered as part of his or her PIN. According to some embodiments, standard ATM devices may be utilized (e.g., column buttons may be used to scroll through and select PIN icons). Moreover, a user might opt to view additional advertising information 2050, such as special offers or promotions, or such information 2050 might be displayed after the user has completed his or her normal banking transaction.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, not that any number of other configurations may be provided in accordance with embodiments of the present invention (e.g., some of the information associated with the databases described herein may be combined or stored in external systems). Moreover, although examples of specific types of servers and member devices have been used, embodiments of the present invention could be used with other types of devices (e.g., a member might use a wired touch-tone telephone to provide column identifiers).

Moreover, although specific icons have been presented as example, note that security application keys may included many different types of images: alphanumeric characters, corporate icons, personal icons (e.g., a picture of a friend), special icons that might be purchased or received free of charge, videos, and/or music sound clips.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A member authentication method, comprising:
   receiving, at a security server from a client server, a member authentication request associated with a member attempting to access confidential information from the client server via a first member device associated with the member;
   determining at the security server a secure key associated with the member, wherein the secure key comprises an ordered sequence of symbols;
   determining a one-time plurality of symbol sets associated with the secure key, wherein the ordered sequence of symbols is included within the plurality of symbol sets;
   transmitting data associated with the secure key from the security server to an authentication device associated with the member, wherein the data associated with the secure key comprises a matrix having columns and rows, each column in the matrix representing one of the symbol sets, and further wherein said authentication device includes a display, said secure key information entered using a touch screen keypad on said display, wherein a matrix size of said matrix is selected by the security server based at least in part on a size of said display;
   entering, by the member, secure key information into the authentication device, wherein said entered secure key information comprises one of: (i) a sequence of matrix row selections entered by the member without including matrix column selections, or (ii) a sequence of matrix column selections entered by the member without including matrix row selections;
   receiving, at the security server from the authentication device, the entered secure key information;
   validating the entered secure key information at the security server;
   based on the validated entered secure key information, authenticating the member; and
   responsive to said authentication, transmitting, by the client server, the confidential information from the client server to the first member device.

2. The method of claim 1, wherein the authentication device comprises a second member device.

3. The method of claim 1, wherein the authentication device comprises the first member device.

4. The method of claim 1, wherein at least one of the symbols in the one of the symbol sets comprises an advertising image.

5. The method of claim 4, wherein said advertising image is selected based at least in part on a preference indicated by said member.

6. The method of claim 4, wherein said advertising image is formed as an animated image, said animating image displaying a plurality of different images.

7. The method of claim 4, wherein said advertising image is associated with an advertising message, said advertising message displayed to said member if said member selects said advertising image.

8. The method of claim 1, wherein said first member device comprises at least one of: (i) a computer; (ii) a Personal Digital Assistant, (iii) a mobile telephone, or (iv) an automated teller device.

9. The method of claim 1, further comprising:
   receiving, from said member, a selection of said secure key information;
   wherein said selection is received from said member prior to said receiving said member authentication request.

10. The method of claim 9, wherein said selection of said secure key information includes a selection of at least one brand preference.

11. The method of claim 1, wherein the secure key information received from the member comprises an ordered list of column identifiers and said validating the secure key information comprises:
    comparing the ordered list of columns identifiers, the symbol sets associated with those columns, and the ordered sequence of symbols representing the secure key.

12. The method of claim 1, wherein the first member device communicates with the client server via a first communication band and the authentication device communicates with the security server via a second communication band different than the first communication band.

13. The method of claim 12, wherein the first member device comprises a personal computer executing a web browser application, the first communication band comprises the Internet, the authentication device comprises a wireless telephone, and the second communication band comprises a wireless telephone network.

14. The method of claim 1, further comprising prior to said receiving of the member authentication request:
    transmitting, from a member device associated with the member to the client server, a primary key; and
    validating the primary key at the client server.

15. The method of claim 1, further comprising:
    enabling a highlight feature for at least one symbol.

16. The method of claim 1, wherein said receiving is associated with a security application display and further comprising:
associating a user-selected background with the security application display.

17. A plurality of non-transient computer-readable medium storing instructions adapted to be executed by processors to perform a method, said method comprising:
receiving, at a security server from a client server, a member authentication request associated with a member attempting to access confidential information from the client server via a first member device associated with the member;
determining at the security server a secure key associated with the member, wherein the secure key comprises an ordered sequence of symbols;
determining a one-time plurality of symbol sets associated with the secure key, wherein the ordered sequence of symbols is included within the plurality of symbol sets;
transmitting data associated with the secure key from the security server to an authentication device associated with the member, wherein the data associated with the secure key comprises a matrix having columns and rows, each column in the matrix representing one of the symbol sets, and further wherein said authentication device includes a display, said secure key information entered using a touch screen keypad on said display, wherein a matrix size of said matrix is selected by the security server based at least in part on a size of said display;
entering, by the member, secure key information into the authentication device, wherein said entered secure key information comprises one of: (i) a sequence of matrix row selections entered by the member without including matrix column selections, or (ii) a sequence of matrix column selections entered by the member without including matrix row selections;
receiving, at the security server from the authentication device, the entered secure key information;
validating the entered secure key information at the security server;
based on the validated entered secure key information, authenticating the member; and
responsive to said authentication, transmitting, by the client server, the confidential information from the client server to the first member device.

18. The medium of claim 17, wherein the authentication device comprises a second member device.

19. The medium of claim 17, wherein the authentication device comprises the first member device.

20. The medium of claim 17, wherein at least one of the symbols in the one of the symbol sets comprises an advertising image.

* * * * *